(12) United States Patent
Pjevach

(10) Patent No.: US 11,592,819 B2
(45) Date of Patent: Feb. 28, 2023

(54) ROBOTIC LAWN MOWER INCLUDING REMOVABLE RECHARGEABLE BATTERY MODULE

(71) Applicant: Briggs & Stratton, LLC, Wauwatosa, WI (US)

(72) Inventor: Robert Pjevach, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 899 days.

(21) Appl. No.: 16/464,426

(22) PCT Filed: Nov. 29, 2017

(86) PCT No.: PCT/US2017/063583
§ 371 (c)(1),
(2) Date: May 28, 2019

(87) PCT Pub. No.: WO2018/102338
PCT Pub. Date: Jun. 7, 2018

(65) Prior Publication Data
US 2021/0116911 A1    Apr. 22, 2021

Related U.S. Application Data

(60) Provisional application No. 62/427,682, filed on Nov. 29, 2016.

(51) Int. Cl.
*A01D 34/00* (2006.01)
*A01D 34/78* (2006.01)
(Continued)

(52) U.S. Cl.
CPC ......... *G05D 1/0088* (2013.01); *A01D 34/008* (2013.01); *A01D 34/78* (2013.01);
(Continued)

(58) Field of Classification Search
CPC ....... A01D 34/008; A01D 34/78; A01D 69/02
See application file for complete search history.

(56) References Cited

U.S. PATENT DOCUMENTS 3,973,378 A * 8/1976 Bartasevich ......... A01D 34/305
56/246
4,446,680 A * 5/1984 D'Alessandro ........ A01D 34/84
56/11.9

(Continued)

FOREIGN PATENT DOCUMENTS

EP         2412221 A2 *  2/2012 ........... A01D 34/006
EP       3 069 593 A1    9/2016
(Continued)

OTHER PUBLICATIONS

Extended European Search Report and Written Opinion regarding Appl. No. EP 17876603.6, dated Nov. 10, 2020, 10 pps.
(Continued)

Primary Examiner — Alicia Torres
(74) Attorney, Agent, or Firm — Foley & Lardner LLP

(57) ABSTRACT

A robotic lawn mower includes a first wheel driven by a first electric wheel motor, a second wheel driven by a second electric wheel motor, a cutting implement driven by an electric cutting implement motor, a power system for powering the electric wheel motors and the electric cutting implement motor, and a controller configured to control operation of the electric wheel motors and the electric cutting implement motor to autonomously mow a yard. The power system includes multiple removable rechargeable battery modules and multiple receptacles, each receptacle configured to receive one of the battery modules.

17 Claims, 18 Drawing Sheets

(51) Int. Cl.
*A01D 69/02* (2006.01)
*G05D 1/00* (2006.01)
*B60L 53/80* (2019.01)
*B60L 53/30* (2019.01)
*H01M 50/249* (2021.01)
*H01M 50/247* (2021.01)
*H01M 50/244* (2021.01)
*H01M 50/204* (2021.01)
*G05D 1/02* (2020.01)
*H01M 10/0525* (2010.01)
*H01M 10/46* (2006.01)
*A01G 20/47* (2018.01)
*A01D 34/416* (2006.01)
*A01D 101/00* (2006.01)
*A01G 3/053* (2006.01)
*H02J 7/00* (2006.01)

(52) U.S. Cl.
CPC .............. *A01D 69/02* (2013.01); *B60L 53/30* (2019.02); *B60L 53/80* (2019.02); *G05D 1/0219* (2013.01); *G05D 1/0225* (2013.01); *H01M 10/0525* (2013.01); *H01M 10/46* (2013.01); *H01M 50/204* (2021.01); *H01M 50/244* (2021.01); *H01M 50/247* (2021.01); *H01M 50/249* (2021.01); *A01D 34/416* (2013.01); *A01D 2101/00* (2013.01); *A01G 3/053* (2013.01); *A01G 20/47* (2018.02); *G05D 2201/0208* (2013.01); *H02J 7/0063* (2013.01)

(56) References Cited

U.S. PATENT DOCUMENTS

| | | | |
|---|---|---|---|
| 5,444,965 A * | 8/1995 | Colens | A01D 69/02 56/10.2 J |
| 5,894,715 A | 4/1999 | Braun et al. | |
| 2003/0037525 A1 | 2/2003 | Iida et al. | |
| 2006/0090439 A1 * | 5/2006 | Anderson | A01D 34/47 56/10.2 G |
| 2008/0161968 A1 | 7/2008 | Adegbile | |
| 2008/0282658 A1 * | 11/2008 | Bernini | A01D 34/008 56/10.2 D |
| 2012/0227994 A1 * | 9/2012 | Yang | H02J 7/0013 173/217 |
| 2014/0022826 A1 | 1/2014 | He et al. | |
| 2014/0129027 A1 | 5/2014 | Schnittman | |
| 2016/0183451 A1 | 6/2016 | Conrad et al. | |
| 2016/0332526 A1 | 11/2016 | Svensson et al. | |

FOREIGN PATENT DOCUMENTS

| | | | | |
|---|---|---|---|---|
| FR | 2768298 A1 * | 3/1999 | | A01D 34/78 |
| GB | 2295304 A * | 5/1996 | | A01B 69/008 |
| JP | 2016158594 A * | 9/2016 | | |
| WO | WO-9508256 A1 * | 3/1995 | | A01D 34/78 |
| WO | WO-2014/007694 A1 | 1/2014 | | |
| WO | WO-2016013365 A1 * | 1/2016 | | A01D 34/78 |
| WO | WO-2016/087998 | 6/2016 | | |
| WO | WO-2016/103164 A1 | 6/2016 | | |
| WO | WO-2016104187 A1 * | 6/2016 | | A01D 34/78 |
| WO | WO-2016/155559 A1 | 10/2016 | | |

OTHER PUBLICATIONS

International Search Report and Written Opinion, PCT/US2017/063583, Briggs & Stratton Corporation (dated Feb. 22, 2018).
Ambrogio Robot, Catalogue 2018, 36 pages (2018).

\* cited by examiner

ROBOTIC LAWN MOWER INCLUDING REMOVABLE RECHARGEABLE BATTERY MODULE

CROSS-REFERENCE TO RELATED APPLICATION

This application is a National Stage Application of PCT/US2017/063583, filed Nov. 29, 2017, which claims the benefit of U.S. Provisional Application No. 62/427,682, filed Nov. 29, 2016, both of which are incorporated herein by reference in their entireties.

BACKGROUND

The present invention relates generally to the field of battery-powered outdoor power equipment, and in particular, to robotic lawn mowers. A robotic lawn mower may include a chassis, wheels, a cutting implement, motors configured to drive the wheels and cutting implement, a controller, one or more sensors, and a battery. The robotic lawn mower uses the wheels to move about a yard and uses the cutting implement to trim the grass beneath the mower to provide a lawn having grass of a uniform length. The controller uses information from the sensors to navigate the yard, allowing for autonomous operation of the robotic lawn mower. Conventionally, the battery of a robotic lawn mower is fixed to the chassis, and a user must use tools to disassemble the robotic lawn mower in order to remove the battery. Accordingly, conventional robotic lawn mowers have a fixed runtime, after which the lawn mower must stop operation to recharge.

SUMMARY

One embodiment relates to a robotic lawn mower including a first wheel driven by a first electric wheel motor, a second wheel driven by a second electric wheel motor, a cutting implement driven by an electric cutting implement motor, a power system for powering the electric wheel motors and the electric cutting implement motor, and a controller configured to control operation of the electric wheel motors and the electric cutting implement motor to autonomously mow a yard. The power system includes multiple removable rechargeable battery modules and multiple receptacles, each receptacle configured to receive one of the battery modules.

Another embodiment relates to an outdoor power equipment system including a removable rechargeable battery module, a robotic lawn mower, and a portable power tool. The robotic lawnmower includes a receptacle configured to receive the battery module and an electric motor electrically coupled to the receptacle to receive electricity to drive at least one of a wheel and a cutting implement. The portable power tool includes a receptacle configured to receive the battery module and at least one of an electric motor, a light source, and an amplification circuit coupled to the receptacle to receive electricity.

Yet another embodiment relates to an outdoor power equipment system including a removable rechargeable battery module, a robotic lawn mower, and a charger including a receptacle configured to receive the battery module. The robotic lawnmower includes a receptacle configured to receive the battery module and an electric motor electrically coupled to the receptacle to receive electricity to drive at least one of a wheel and a cutting implement. The charger is configured to provide electricity to the receptacle to charge the battery module. The battery module is removable from the robotic lawn mower receptacle and the charger receptacle without the use of tools.

BRIEF DESCRIPTION OF THE DRAWINGS

The invention will become more fully understood from the following detailed description, taken in conjunction with the accompanying drawings, in which:

FIG. 22 is a chart comparing the total energy capacity of a conventional power system to the total energy capacity of

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to the figures, a robotic lawn mower is shown according to various exemplary embodiments. The robotic lawn mower is configured to operate autonomously to maintain grass in a yard at a desired height. The robotic lawn mower incorporates a scalable power system having a number of removable and replaceable battery modules. The robotic lawn mower includes multiple receptacles configured to selectively receive the battery modules, such that the total energy capacity of the robotic lawn mower can be varied by adding or removing battery modules from the receptacles. This allows multiple end users with different power requirements (e.g., differently sized yards, etc.) to use the same robotic lawn mower. The battery modules can also be replaced to extend the operational duration of the robotic lawn mower. The battery modules are configured to be compatible with other types of power equipment as well. By way of example, the same battery modules may be used to power robotic lawn mowers, string trimmers, leaf blowers, hedge trimmers, small chainsaws, vacuums, lights, radios, etc. Accordingly, the battery modules provide the user with additional utility when the robotic lawn mower is turned off or otherwise inactive.

Figure 1:
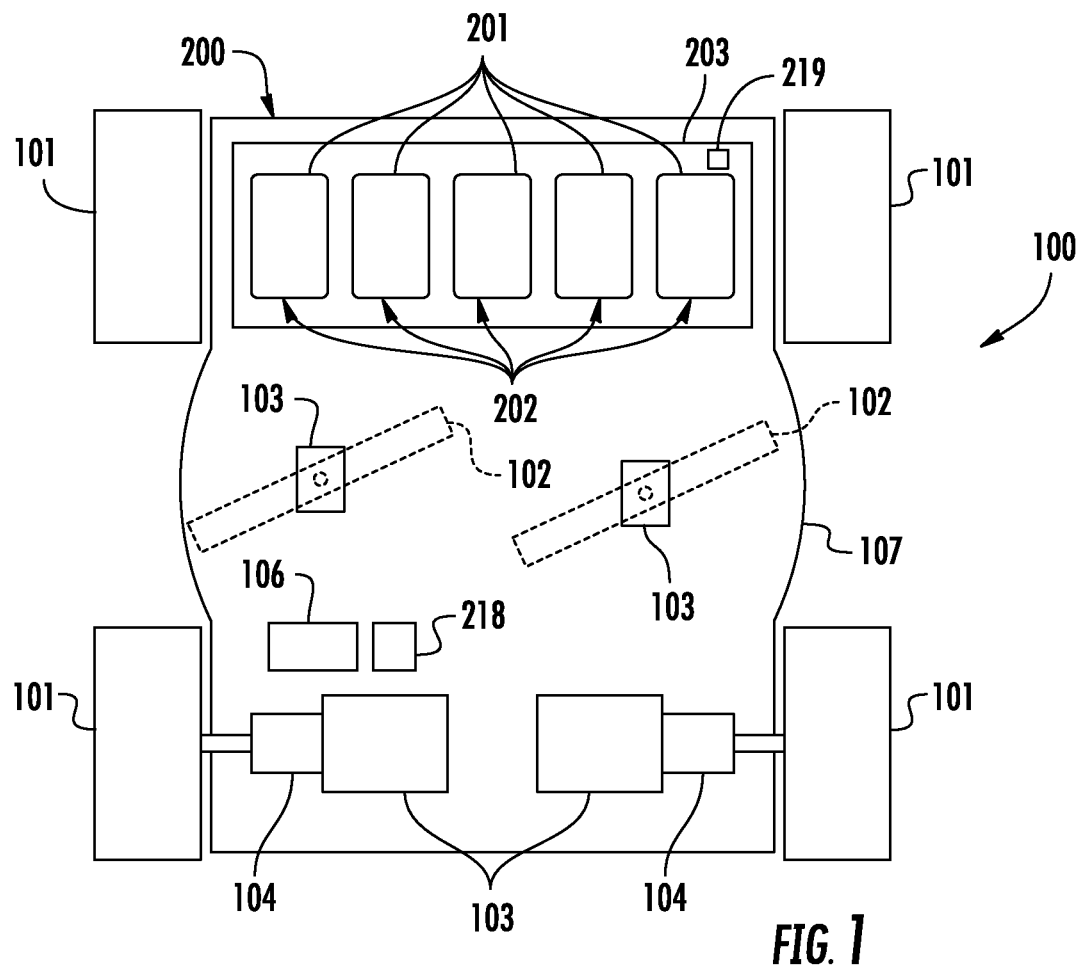
FIG. 1 is a schematic top view of a robotic lawn mower, according to an exemplary embodiment.
Figure 2:
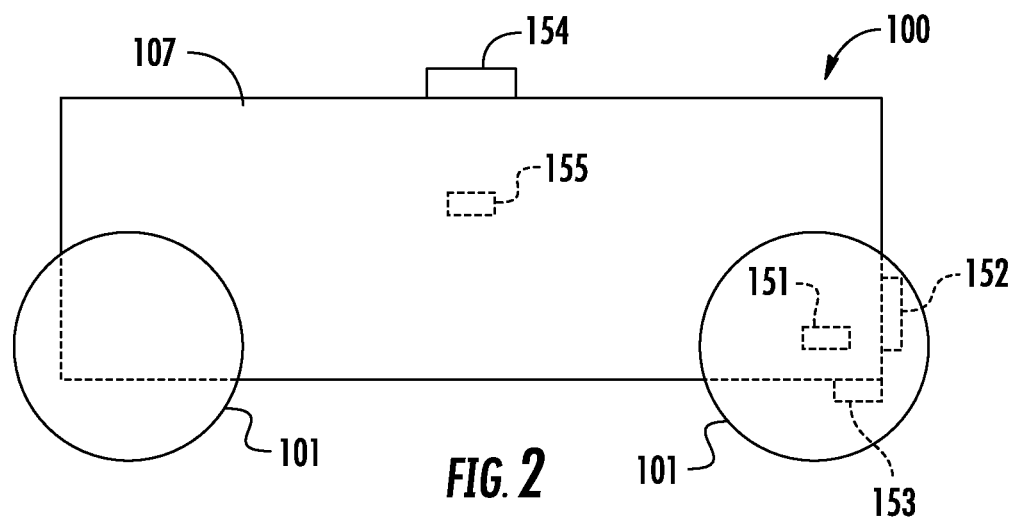
FIG. 2 is a schematic side view of the robotic lawn mower of FIG. 1.

Referring to FIGS. 1 and 2, a piece of outdoor power equipment, shown as robotic lawn mower 100, is illustrated according to an exemplary embodiment. The robotic lawn mower 100 includes a structural chassis or housing 107 that supports wheels 101, each of which are either unpowered or driven by drivers, shown as electric motors 103. As illustrated, a pair of the wheels 101 are each powered by an electric motor 103. In other embodiments, one motor 103 drives two or more wheels 101. The robotic lawn mower 100 includes a cutting implement 102 (e.g., one or more blades, a hub and radially extending string, etc.) that is driven by one or more electric motors 103. In some embodiments, each wheel 101 is driven directly by an electric motor 103. As shown in FIG. 1, each driven wheel 101 is connected to an electric motor 103 through a power transmission device, shown as transmission 104. The transmission 104 may be configured to perform a gear reduction so that the driven wheel 101 and the electric motor 103 rotate at different speeds. In some embodiments, the cutting implement 102 and/or one or more wheels 101 may be powered by the same motor 103 (e.g., through a transmission) 104. The robotic lawn mower 100 also includes a programmable controller 106 in communication with one or more sensors 151-155, shown in FIG. 2, and a user interface 218, shown in FIG. 1. A scalable power system 200 is provided that distributes electrical power to electric motors 103, the programmable controller 106, the sensor(s) 151-155, the user interface 218, and other components of the robotic lawn mower 100.

The robotic lawn mower 100 is configured to autonomously navigate yards of various sizes and shapes while cutting grass in order to maintain a uniform grass length with minimal or no end user interaction. Because the robotic lawn mower 100 can operate without requiring a user's attention, it can operate nearly continuously without a user present. Throughout operation, the robotic lawn mower 100 may make a series of shallow cuts on the same area of grass as opposed to one deep cut, reducing the grass clipping size and the power requirements of the electric motor(s) 103 driving the cutting implement 102. In some embodiments, the robotic lawn mower 100 includes a height adjustment device for adjusting the height of the cutting implement 102 relative to the ground. The height adjustment device may be manually operated or operated by an electrically-powered actuator operatively coupled to the programmable controller 106. In some embodiments, the programmable controller 106 is programmed to adjust the height of the cutting implement 102 depending on the current grass length as detected by a grass height sensor (e.g., the height sensor 153).

Referring to FIG. 1, the scalable power system 200 incorporated into the robotic lawn mower 100 includes a number of removable and rechargeable battery packs or modules 201. The total energy capacity available to the robotic lawn mower 100 may be modified by the user by adding or removing battery modules 201. The scalable power system 200 allows a variety of end users to purchase the same model of robotic lawn mower 100 irrespective of the size of lawn that they wish to mow. End users with larger lawns may configure the system 200 to use a larger amount of battery modules 201 (e.g., four battery modules), whereas an end user with a smaller lawn may configure the system 200 to use a smaller number of battery modules 201 (e.g., two battery modules). The system 200 reduces costs for the manufacturer, as it allows a small number of different lawn mower variants to be properly sized for a broad variety of applications. The system 200 reduces costs for the end user, as it allows the end user to purchase only the amount of battery modules 201 necessary for their specific application.

Conventional robotic mowers do not allow a user to easily change or replace a power supply or battery pack. The battery of a conventional robotic lawn mower is fixed in place (e.g. by screws or other fasteners) and is not intended to be replaced or serviced by the end user. By way of example, such a battery may require specialized tools to be removed. This prevents the end user from replacing a depleted battery with a charged one. Also, at the end of the battery's useful life, the user must either have a dealer or service professional replace the battery or buy a new robotic mower. In contrast, the system 200 allows a user to quickly and easily replace a depleted or dysfunctional battery module 201 with a battery module 201 that is new and fully charged. In some embodiments, a user may be able to remove a battery module 201 without any tools.

The scalable power system 200 allows the user to manage the total energy capacity provided by the system 200 to meet their specific needs. When those needs change (e.g., moving to a house with a larger yard), the user can buy additional battery modules 201 to meet their new needs. A distributor, original equipment manufacturer ("OEM"), or other seller of equipment can provide a user with a number of battery modules 201 expected to meet the specific user's expected needs and then take back or add battery modules 201 as needed to meet the user's actual needs. The battery modules 201 provided to determine the user's actual needs could all be returned to the seller after the user's actual needs are determined, and the user may then purchase new battery modules 201 sufficient to meet those needs. A battery management system 219 can be programmed to monitor and track the user's use of the scalable power system 200 to help determine the user's actual needs and to determine the number and type of battery modules 201 required to meet those actual needs.

In some situations, it may be advantageous for the end user to exchange one or more of the battery modules 201 in the robotic lawn mower 100 that are partially or completely depleted of charge for one or more battery modules 201 having a greater charge. This would allow the end user to extend the operational duration of the robotic lawn mower 100, allowing the robotic lawn mower 100 to continue mowing when a conventional robotic lawn mower that incorporates fixed batteries would be forced to cease operation to charge the fixed batteries. This would allow the end user to ensure the entire lawn could be cut by the robotic lawn mower 100 in one session, even if the lawn is larger than what the onboard battery modules 201 can handle on a single charge.

Figure 3:
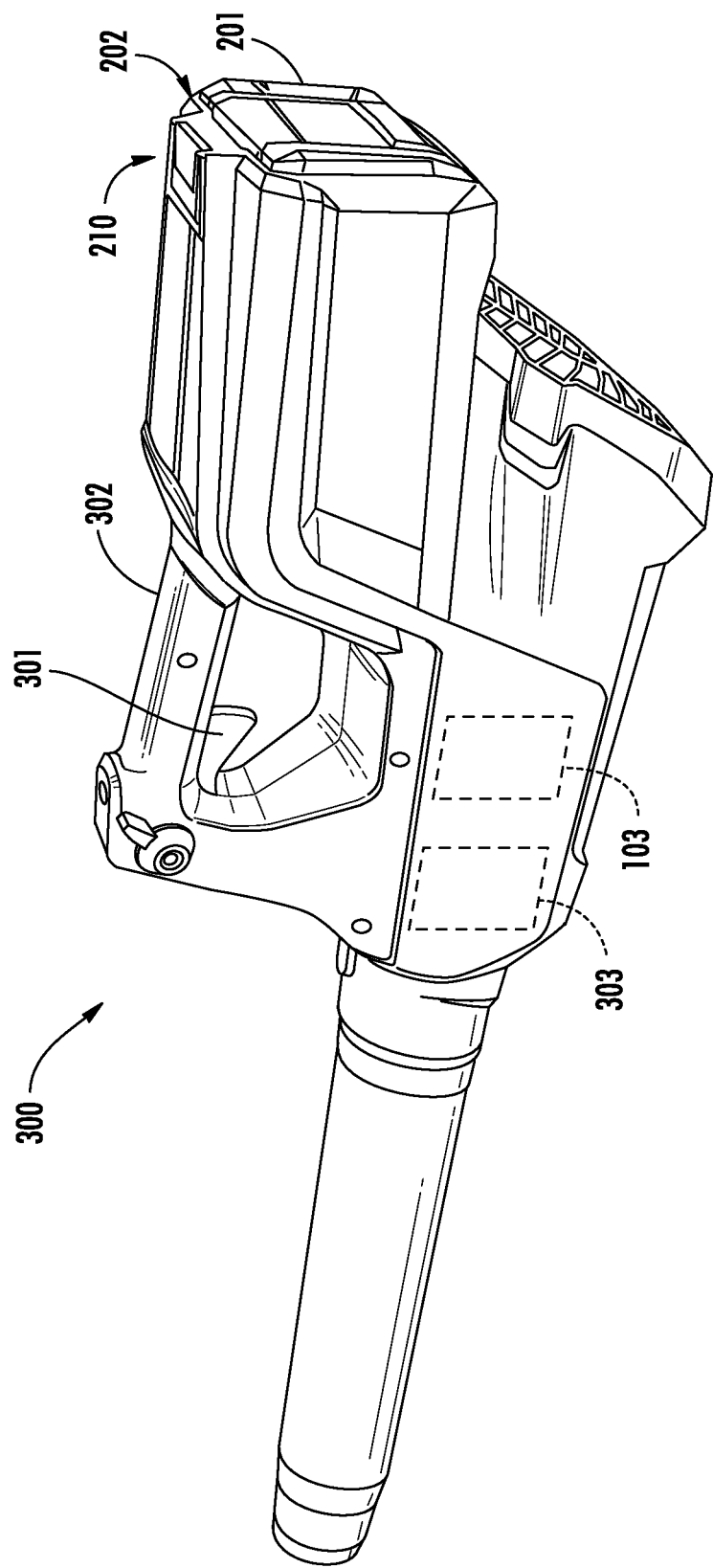
FIG. 3 is a perspective view of a leaf blower, according to an exemplary embodiment.
Figure 4:
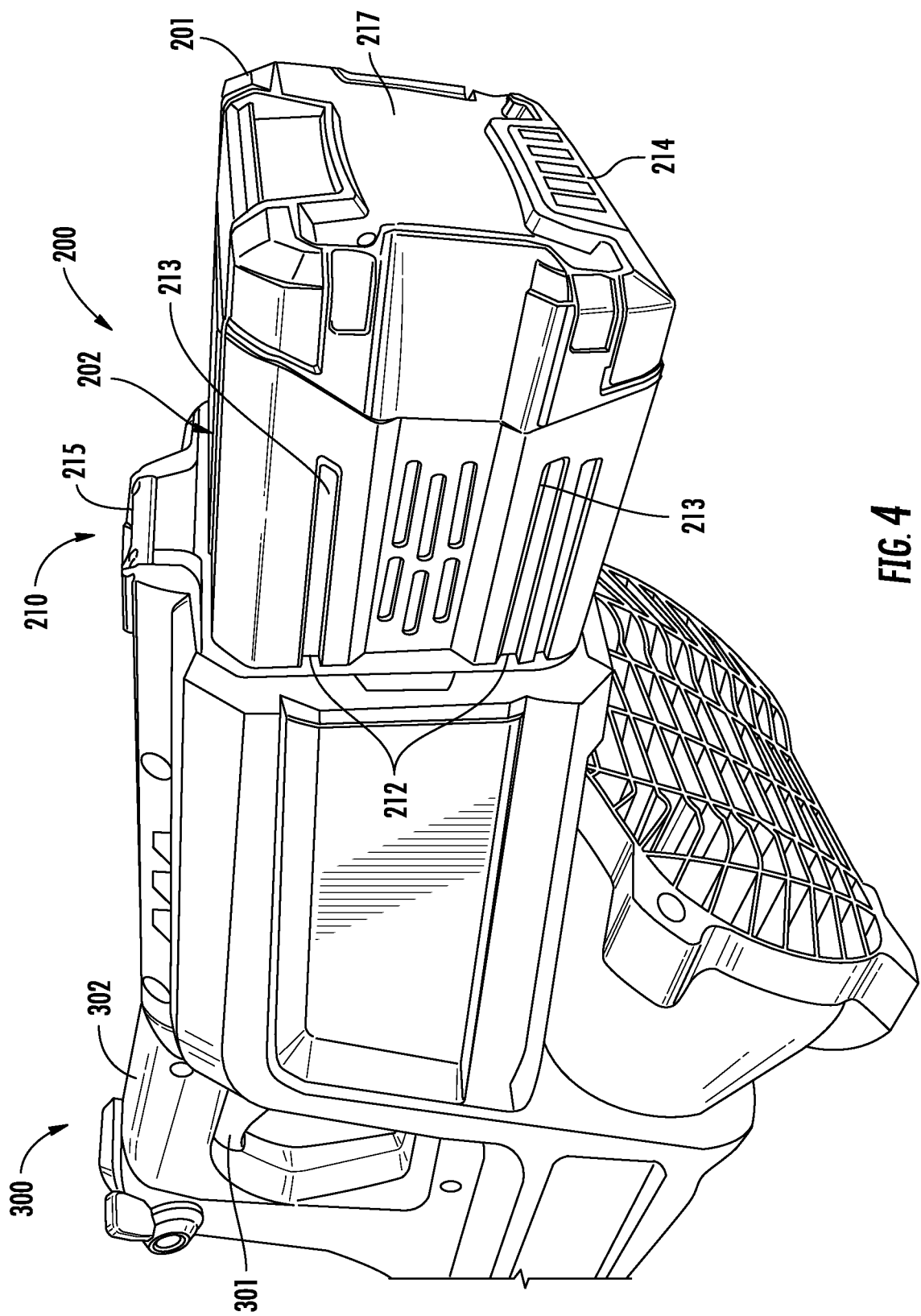
FIG. 4 is another perspective view of the leaf blower of FIG. 3.

The battery modules 201 can be used in other portable power equipment as well (e.g., string trimmers, leaf blowers, small chainsaws, vacuums, lights, radios, etc.). Employing the same battery modules 201 in other equipment provides the end user with additional utility from the battery modules 201 of the robotic lawn mower 100 when the robotic lawn mower 100 is turned off or otherwise inactive. The robotic lawn mower 100, one or more battery modules 201, a standalone charger 500, and one more additional pieces of power equipment powerable by the battery modules 201 can be sold in a bundle or package. For example, the end user could use a string trimmer to cut grass in any areas that the robotic lawn mower 100 could not reach and use a leaf blower 300 to blow away the grass clippings produced by the string trimmer. FIGS. 3 and 4 illustrate a piece of outdoor power equipment or power tool, shown as leaf blower 300, that could be bundled with the robotic lawn mower 100. The leaf blower 300 includes a receptacle 202 similar to the receptacles 202 included in the robotic lawn mower 100. The receptacle 202 is configured to house and electrically couple the battery module 201 to the leaf blower 300. The leaf blower 300 also includes a user input device 301 (e.g. a trigger or button) configured to selectively activate the leaf blower 300, an electric motor 103, a grip or handle 302, and a fan or blower 303 that is powered by the electric motor 103. In some embodiments, other portable power equipment or tools (e.g. string trimmers) incorporate some of the same elements as the leaf blower 300, including a user input device 301, a receptacle 202, a grip or handle 302, and an electric motor 103 that uses electrical power from the battery module 201 and powers an implement (e.g., the spindle shaft that drives the trimmer head of a string trimmer, the chain of a chain saw, the impeller of a vacuum) or other essential component of the power tool (e.g., the light source of a light, an amplification circuit for a speaker of a radio, etc.).

Referring to FIGS. 5-8, the rechargeable battery module 201 is illustrated according to an exemplary embodiment. The battery module 201 can provide different system voltage (volts), capacity (amp-hours), and energy capacity (watt-hours) levels in different cell configurations (e.g., by using different types, different configurations, or different numbers of battery cells). Each battery module 201 includes a number of battery cells 207. In some embodiments, the battery cells 207 are lithium-ion cells. In other embodiments, the cells 207 are other types of cells (e.g. lead acid, nickel cadmium, etc.). For example, a battery module 201 may be rated at 36 volts, 48 volts, 72 volts, etc., depending on the intended end use. The cells 207 may be arranged in groups connected in series and/or connected in parallel. In some embodiments, the battery module 201 is rated at 82 volts and is available in 2.0 Amp-hour and 4.0 Amp-hour capacities. The battery modules 201 each include a housing or outer shell 217 to house, seal, and provide structure for the cells 207 and protect the cells 207 from impact. In some embodiments, the battery modules 201 include an interface 214 that indicates to the user how much charge remains in the battery module 201. The interface 214 may include a push button for user input and a number of lights that indicate the remaining charge to the user. By way of example, if a battery module 201 is currently charged to 100% capacity, four lights of the interface 214 may be illuminated in response to the user interacting with the push button. If the battery module then drains to 75% capacity, three lights of the interface 214 may be illuminated in response to the user interacting with the push button.

Figure 7:
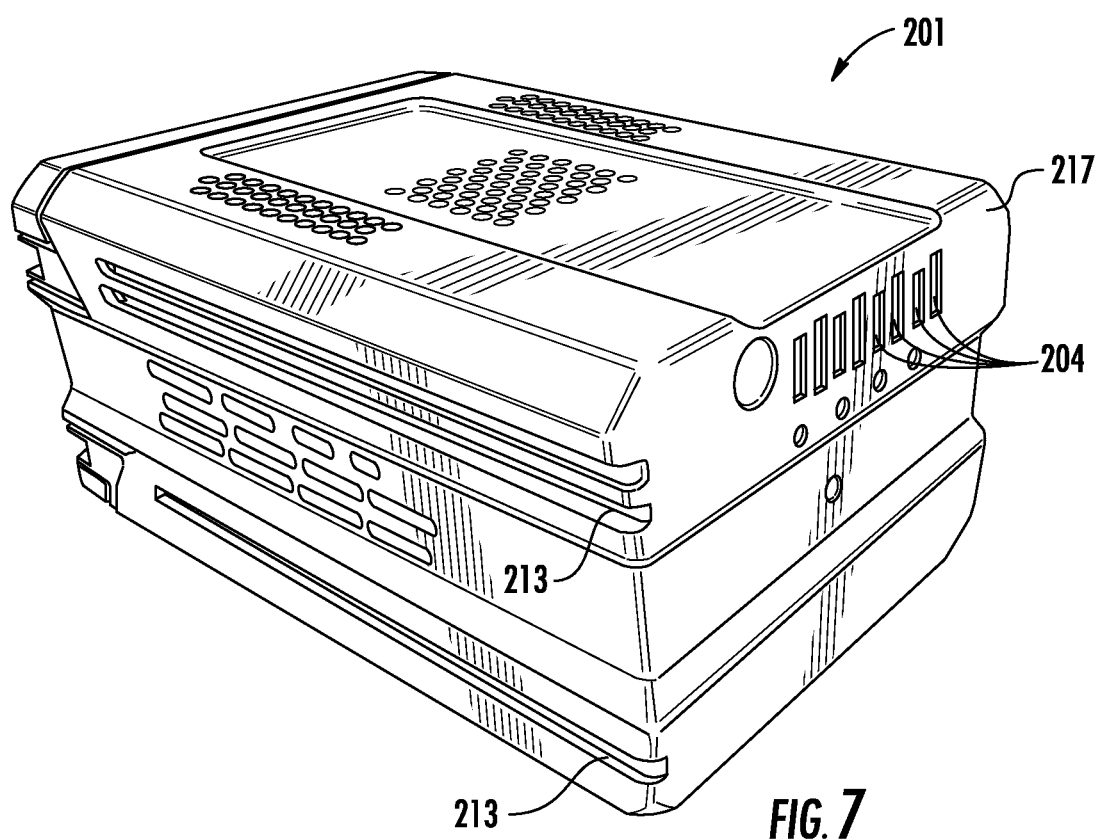
FIG. 7 is a perspective view of the battery module of FIG. 5.
Figure 8:
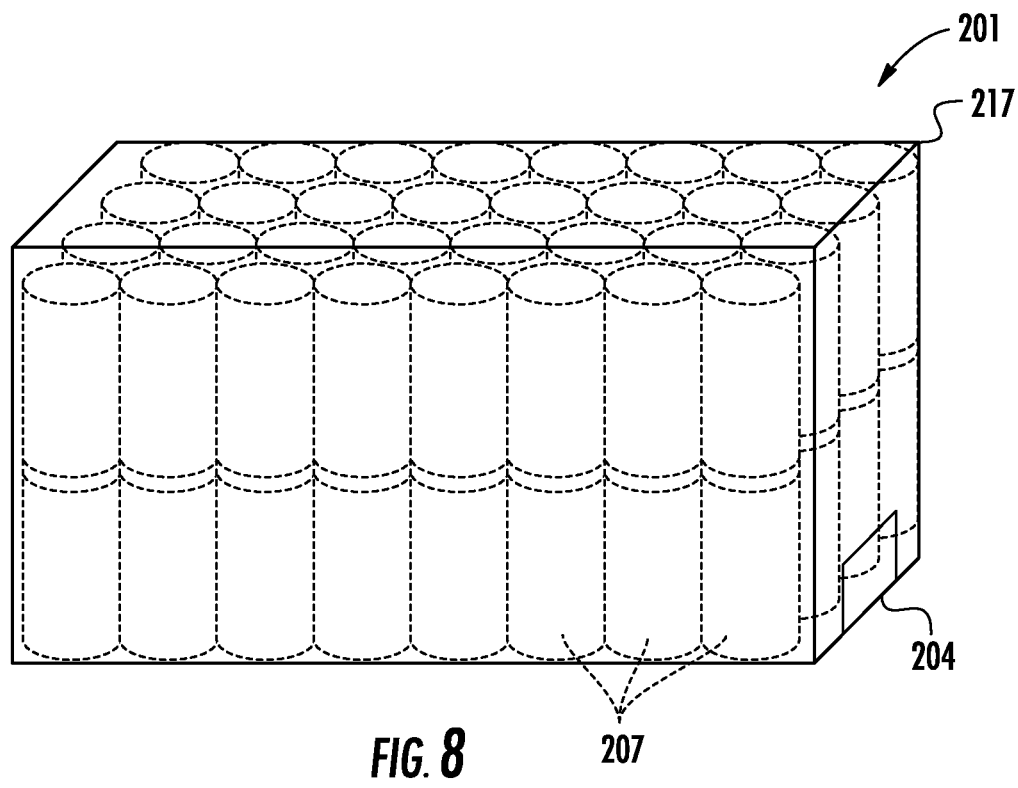
FIG. 8 is a schematic perspective view of the battery module of FIG. 5.
Figure 10:
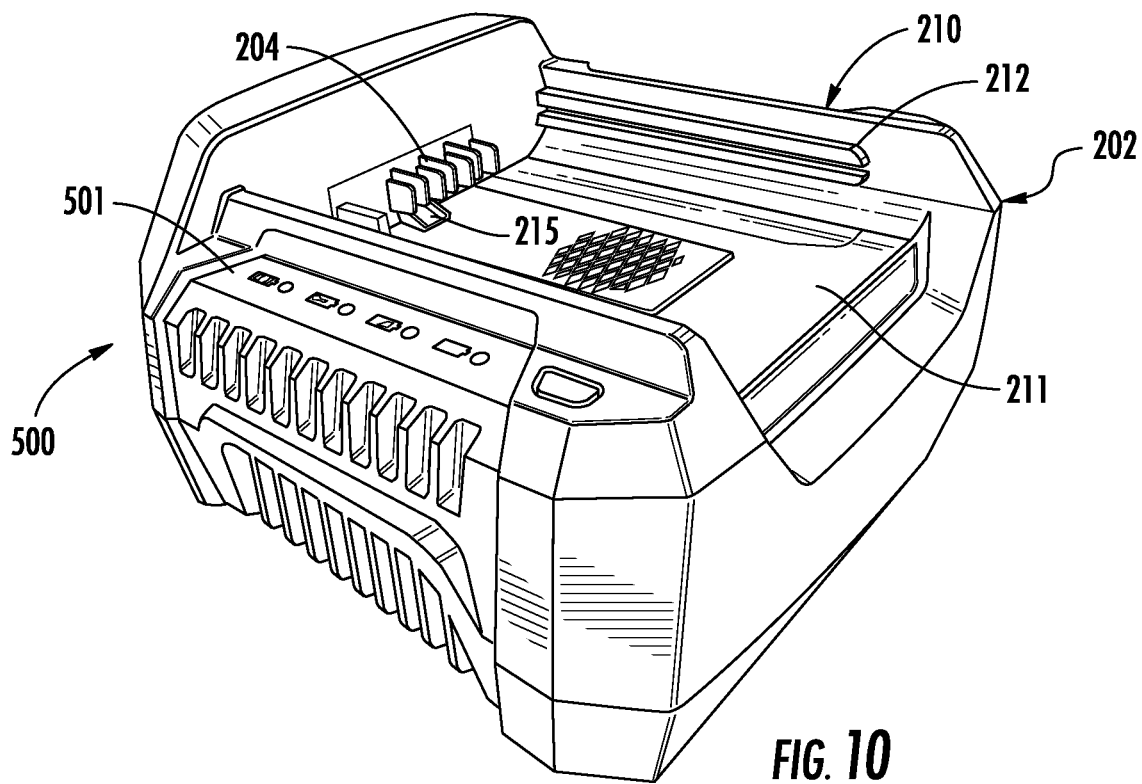
FIG. 10 is a perspective view of a charger for use with the battery module of FIG. 5, according to an exemplary embodiment.

Because the power system 200 is scalable by installing and removing battery modules 201 as needed, the battery modules 201 need to be of a manageable size and weight for the end user to lift, carry, install, remove, etc. so that the battery module 201 is configured to facilitate manual portability by the user. The battery module 201 is small enough, light enough, and graspable enough to be manually portable by a user. The user does not need a lift, cart, or other carrying device to move the battery modules 201. In some embodiments, the battery module 201 includes a grip or handle to facilitate manual portability by the end user. As shown in FIGS. 7 and 10, the battery module 201 also defines one or more channels 213 that are configured to receive keys or rails 212 raised from the surface of the receptacle 202 to guide the battery module 201 into position when installed into a receptacle 202. In other embodiments, the receptacles 202 define channels 213 configured to receive raised rails 212 on the battery modules 201. In some embodiments, the robotic lawn mower 100 is also of a manageable size and weight for the end user. For example, in some embodiments the robotic mower 100 weighs 30 pounds or less and the battery module 201 weighs six pounds (2.72155 kilograms) or less so that in embodiments of the mower 100 including four battery receptacles 202, the maximum weight of the mower 100 with four battery modules 201 installed is sixty pounds (27.2155 kilograms) or less.

Figure 12:
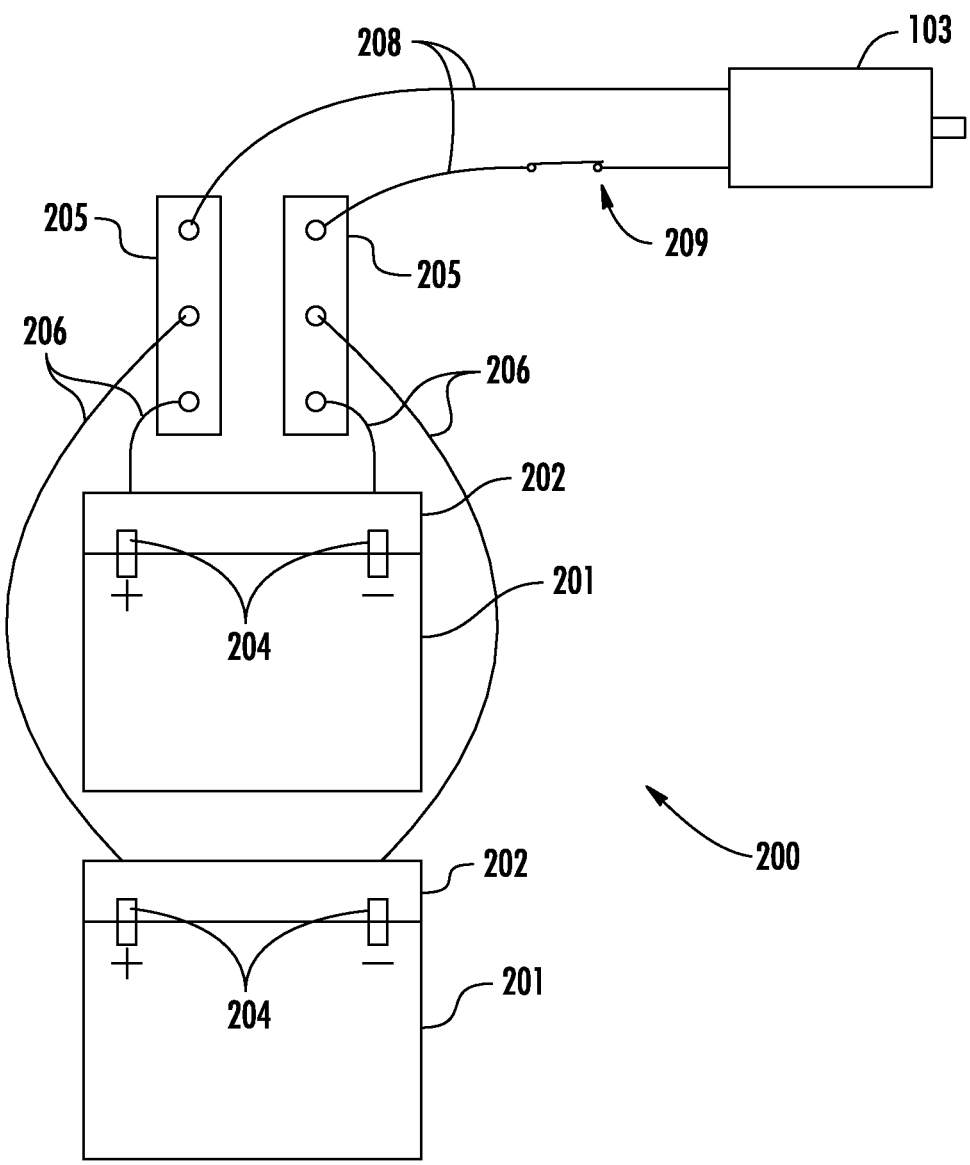
FIG. 12 is a schematic view of a user-scalable power system, according to an exemplary embodiment.

Referring to FIG. 1, the scalable power system 200 includes a base 203 coupled to or integrally formed as part of the housing 107 of the robotic lawn mower 100. The base 203 has multiple mounting locations, shown as receptacles 202, each configured to receive one battery module 201. The base 203 provides a structure to support the receptacles 202. As shown in FIG. 1, the base 203 is a horizontal tray or platform that includes the receptacles 202. In other embodiments, the base 203 is arranged as a vertical or angled rack in which the receptacles 202 may be located one above the other. The receptacles 202 and the battery modules 201 each include electrical connectors or contacts 204 that allow current to flow between the battery modules 201 and the receptacles 202. In some embodiments the receptacle 202 includes a set of male contacts 204 configured to mate with a corresponding set of female contacts 204 on the battery module 201. In other embodiments, the receptacle 202 includes a set of female contacts 204 and the battery module 201 includes a set of male contacts 204. In some embodiments, the receptacles 202 are electrically connected to one another in parallel. As shown in FIG. 12, the receptacles 202 are electrically coupled to a terminal block or power bus 205 by a series of wires 206 or bus bars. The power bus 205 distributes electrical energy from the battery modules 201 through wires 208 to power a load (e.g. a motor 103). An electrical disconnect switch 209 may be provided to disconnect the battery modules 201 such that no current can be supplied through the wires 208 to power an electrical load. The switch 209 may be any type of switch (e.g., a toggle switch, a push button switch, a relay, etc.) and may be mechanically or electrically actuated.

Figure 9:
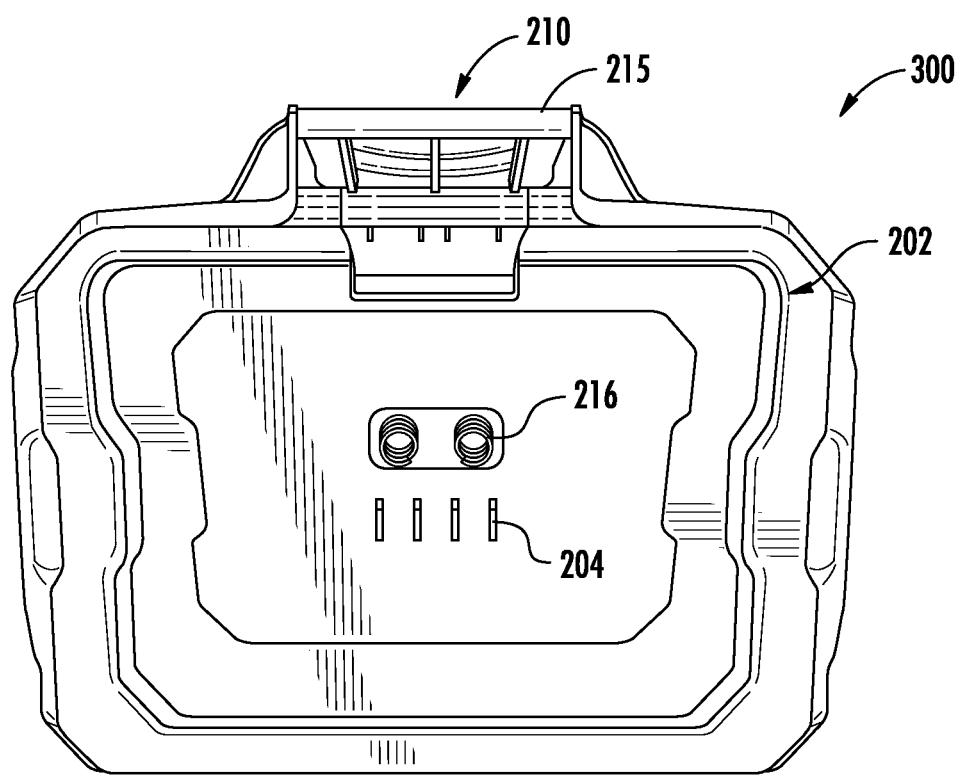
FIG. 9 is a front view of a receptacle for the battery module of FIG. 5, according to an exemplary embodiment.
Figure 11:
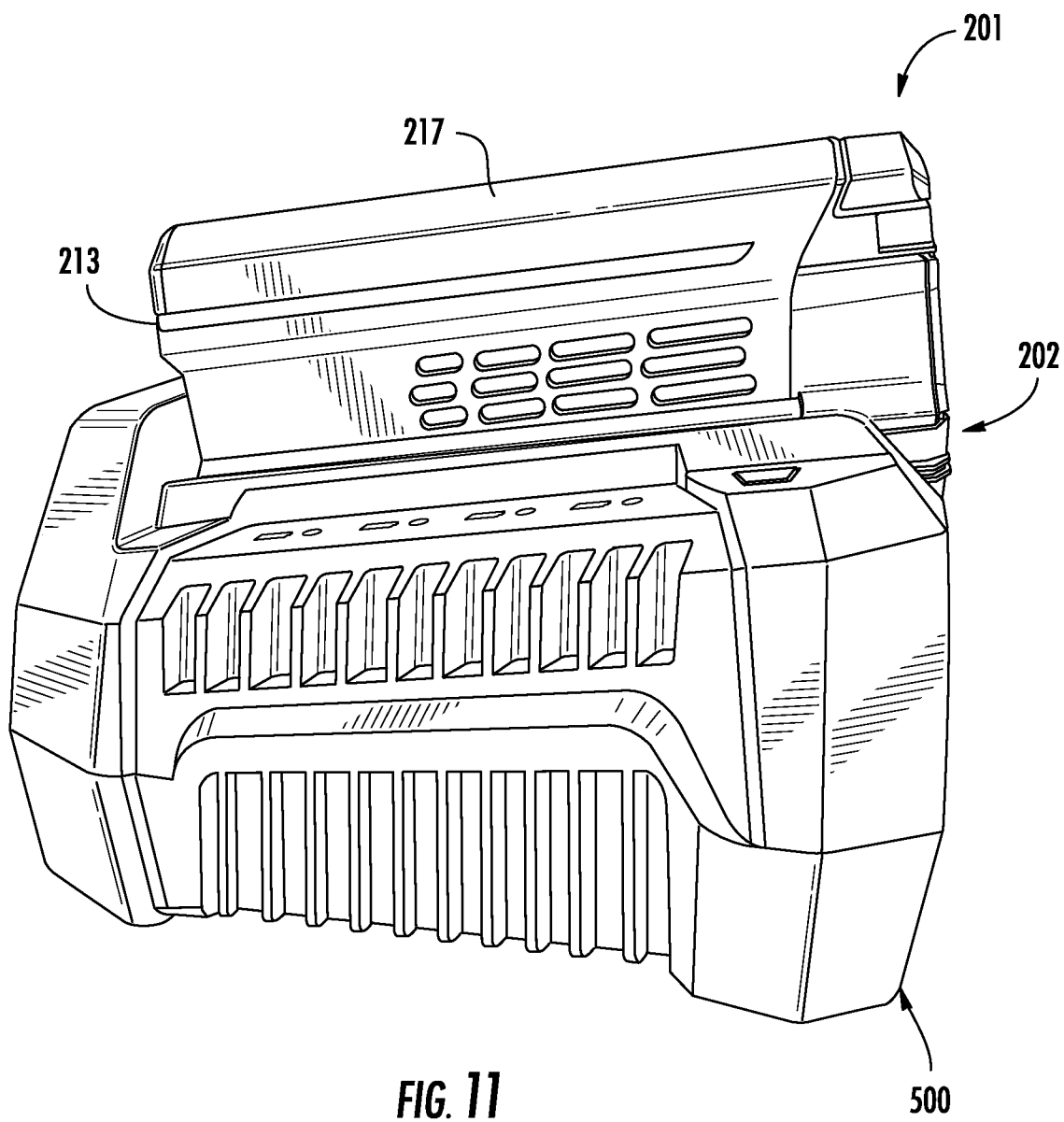
FIG. 11 is a side view of the charger of FIG. 10 connected to the battery module of FIG. 5.

Each of the receptacles 202 may include one or more retainers or locking mechanisms 210 configured to secure the battery module 201 to the receptacle 202. In some embodiments, as shown in FIGS. 3, 4, and 9, the receptacle 202 at least partially surrounds the battery module 201 such that the battery module 201 can only translate along one axis. The locking mechanism 210 also includes a latch 215 that locks into, pushes on, or otherwise engages the battery module 201, securing it in the receptacle 202. The locking mechanism 210 includes a spring 216 that assists the user in removing the battery module 201 by providing a biasing force to bias the battery modules 201 partially or totally out of the receptacle 202. In other embodiments, as shown in FIGS. 10 and 11, the locking mechanism 210 includes a base or support 211 and one or more rails 212 extending outward from the support 211. The channel 213 of the battery module 201 is sized to receive the rail 212 of the locking mechanism 210 in order to guide the battery module 201 into an engaged position relative to the receptacle 202 so that the contacts 204 of the battery module 201 fully engage the contacts 204 of the receptacle 202, completing the electrical connection between the battery module 201 and the receptacle 202. In other embodiments, the positions of the rails 212 and the channels 213 are switched so that the rail 212 is located on the battery module 201, and the channel 213 is located on the locking mechanism 210. The receptacle 202 further includes a latch 215 that engages the exterior of the battery module 201, providing resistance against removal of the battery module 201. In some embodiments, the battery modules 201 can be attached to and removed from the receptacles 202 without the use of tools. This simplifies the process of attaching or removing battery modules 201. In some embodiments, different locking mechanisms are provided (e.g., latches, straps, or locks) that may be secured with or without the use of hand tools to secure a battery module 201 to a receptacle 202.

Depending on the needs of a particular user, the scalable power system 200 may have one or more unused or empty receptacles 202. In some embodiments, a cover or other protective device is provided to temporarily cover open receptacles 202 that do not have a battery module 201 installed (e.g., when a user has only a small area of grass to maintain). The cover may be configured to seal the unused receptacle 202, preventing water and debris from accumulating in the receptacle 202 and limiting user access to the receptacle 202. The cover may be secured in place by the same locking mechanism 210 as the battery modules 201.

The scalable power system 200 includes a battery management system or controller 219. The controller 219 includes a processor and a memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to processor through a processing circuit and includes computer code for executing (e.g., by processing circuit and/or processor) one or more processes described herein. In some embodiments, the battery management system 219 includes both hardware and software. In other embodiments, the battery management system 219 is entirely hardware based. In some embodiments, the battery management system 219 is integrated with the programmable controller 106.

The battery management system 219 controls charging and discharging of the battery modules 201 to optimize operation of the system 200 and individual battery modules 201. The battery management system 219 is programmed to automatically manage current draw from the battery modules 201 to power an electrical load. System-wide control of the battery modules 201 is necessary to allow the individual battery modules 201 to communicate and coordinate charge levels and discharge rates and control which battery module 201, or groups of battery modules 201, is being discharged during particular moments of operation.

The battery management system 219 may allow the battery modules 201 to be "hot swapped" into and out of the system 200 without regard for the charge of the battery module 201 being added or the battery modules 201 remaining connected to receptacles 202. The battery management system 219 controls which battery modules 201 supply current to the power bus 205. The battery management system 219 communicates with and controls the operation of each battery module 201 connected to the base 203. The battery management system 219 determines which battery module 201 or group of battery modules 201 provides current to the power bus 205 or even to another battery module 201 to recharge that battery module 201. The battery management system 219 is used to control the state of charge of one or more of the battery modules 201 by managing the relative charge levels of the multiple battery modules 201 in use in the system 200. In some embodiments, the battery module 201 with the lowest charge level is not used and does not provide power to the equipment being powered by the system 200 until the other battery modules 201 in the system have reached a similar state of charge.

Figure 13A:
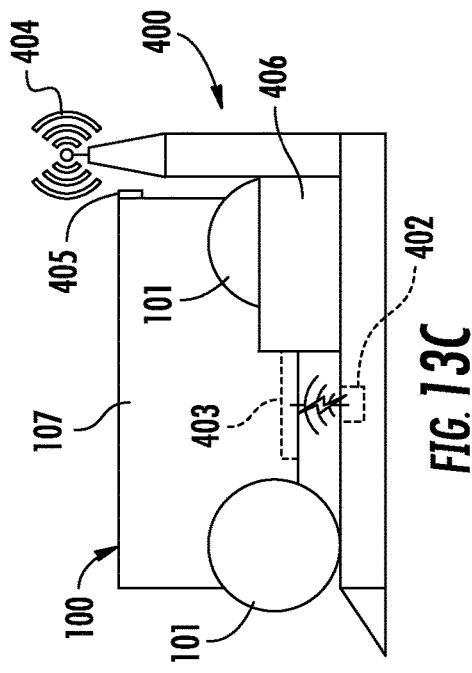
FIG. 13A is a side view of a charging platform for use with the robotic lawn mower of FIG. 1, according to an exemplary embodiment.
Figure 13B:
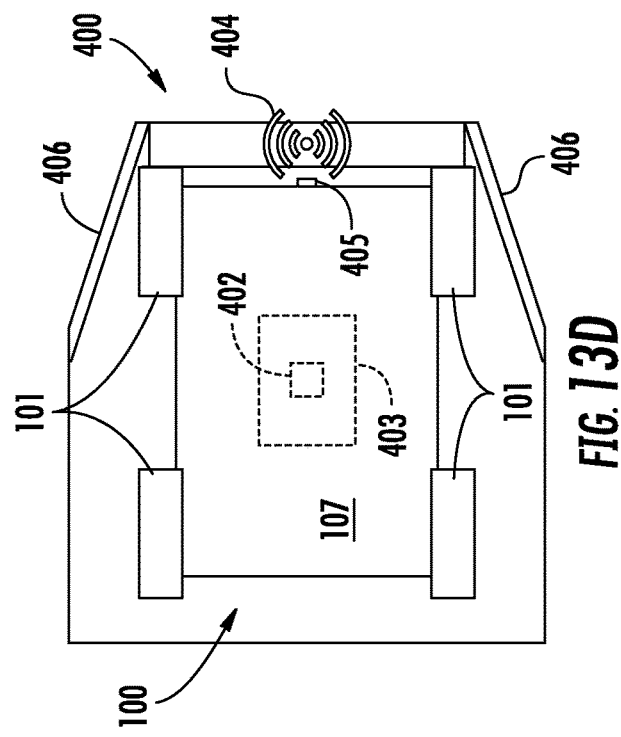
FIG. 13B is a top view of the charging platform of FIG. 13A.
Figure 13C:
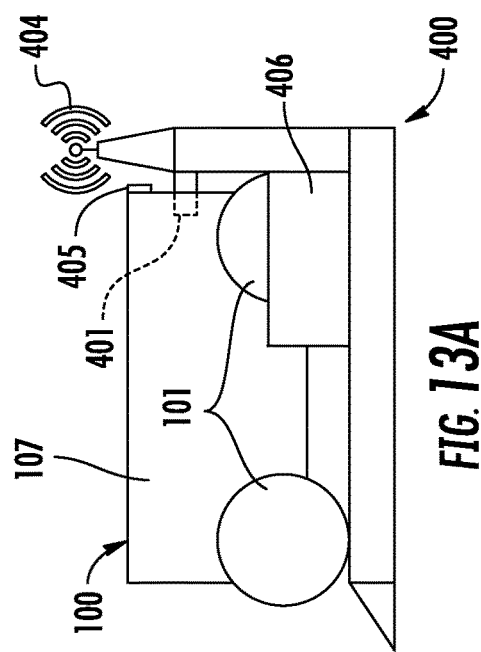
FIG. 13C is a side view of a charging platform for use with the robotic lawn mower of FIG. 1, according to another exemplary embodiment.
Figure 13D:
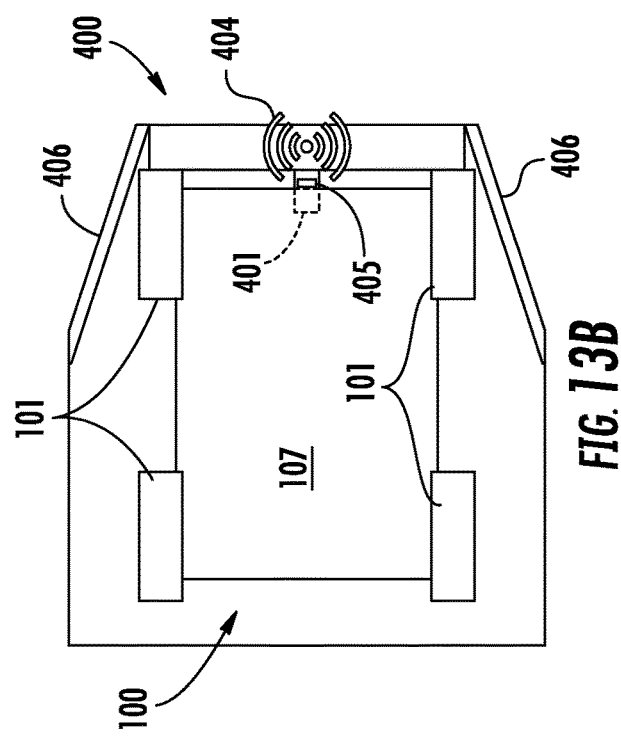
FIG. 13D is a top view of the charging platform of FIG. 13C.

In some embodiments, the robotic lawn mower 100 charges by driving up to or onto a charging platform 400, shown in FIGS. 13A-13D, which serves as both a home location for the robotic lawn mower 100 and a charger for the battery modules 201. In some embodiments, as illustrated in FIGS. 13A and 13B, the charging platform 400 provides electrical power to the robotic lawn mower 100 through physical contacts 401. In the illustrated embodiment, the contacts 401 on the charging platform 400 are male, and the contacts 401 on the robotic lawn mower 100 are female. In other embodiments, the robotic lawn mower 100 includes the male contacts 401 and the charging platform 400 includes the female contacts 401. In yet other embodiments, as illustrated in FIGS. 13C and 13D, the charging platform 400 provides power to the robotic lawn mower 100 through an inductive charging circuit. In this case, the charging platform 400 includes an inductive charging transmitter 402 and the robotic lawn mower 100 includes an inductive charging receiver 403. In some embodiments, the charging platform 400 includes a guide 404 (e.g., an infrared signal emitter) that emits a signal that, when received by a receiver 405 (e.g., an infrared signal receiver) on the robotic lawn mower 100, directs the robotic lawn mower 100 to the charging platform 400. In some embodiments, the charging platform 400 includes one or more walls or rails 406 that contact the robotic lawn mower 100 and guide the robotic lawn mower 100 into a position where the inductive charging circuit (i.e., the transmitter 402 and the receiver 403) and/or physical charging circuit (i.e., the contacts 401) are connected.

In some embodiments, the robotic lawn mower 100 is charged by removing the battery modules 201 and placing them in a standalone charger 500, shown in FIGS. 10 and 11. The charger 500 may be stored indoors, separate from the robotic lawn mower 100, providing a convenient way for the end user to charge the battery modules 201 should the end user choose to use the battery modules 201 with another piece of power equipment (e.g., a string trimmer, the leaf blower 300, a radio, etc.). The charger 500 may include a higher current charging circuit than the inductive charging circuit of the charging platform 400 and accordingly may act as a "fast charger" that charges the battery modules 201 more quickly than the inductive charging circuit. The standalone charger 500 includes a receptacle 202 in order to connect the battery module 201 to the charger 500. In some embodiments, the charger 500 includes an electrical cord to connect to the electrical grid and a transformer, rectifier, or other voltage control device. In some embodiments the charger 500 includes a display 501 (e.g. one or more lights that change colors or flash) that provides the user with information regarding the current state of the battery module 201 (e.g., charged, empty, charging, battery temperature, etc.).

The robotic lawn mower 100 includes a programmable controller 106 that receives information from the sensor(s) 151-155, the user interface 218, and the battery management system 219, and issues commands or returns information to other parts of the robotic lawn mower 100 (e.g. to control the speeds or directions of the motors 103 or to select which battery module(s) 201 to electrically couple to which components). The programmable controller 106 can include a processor and a memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to processor through a processing circuit and includes computer code for executing (e.g., by processing circuit and/or processor) one or more processes described herein. The programmable controller 106 communicates with other parts of the robotic lawn mower 100 using a wired or wireless (e.g. Bluetooth) connection.

Figure 14:
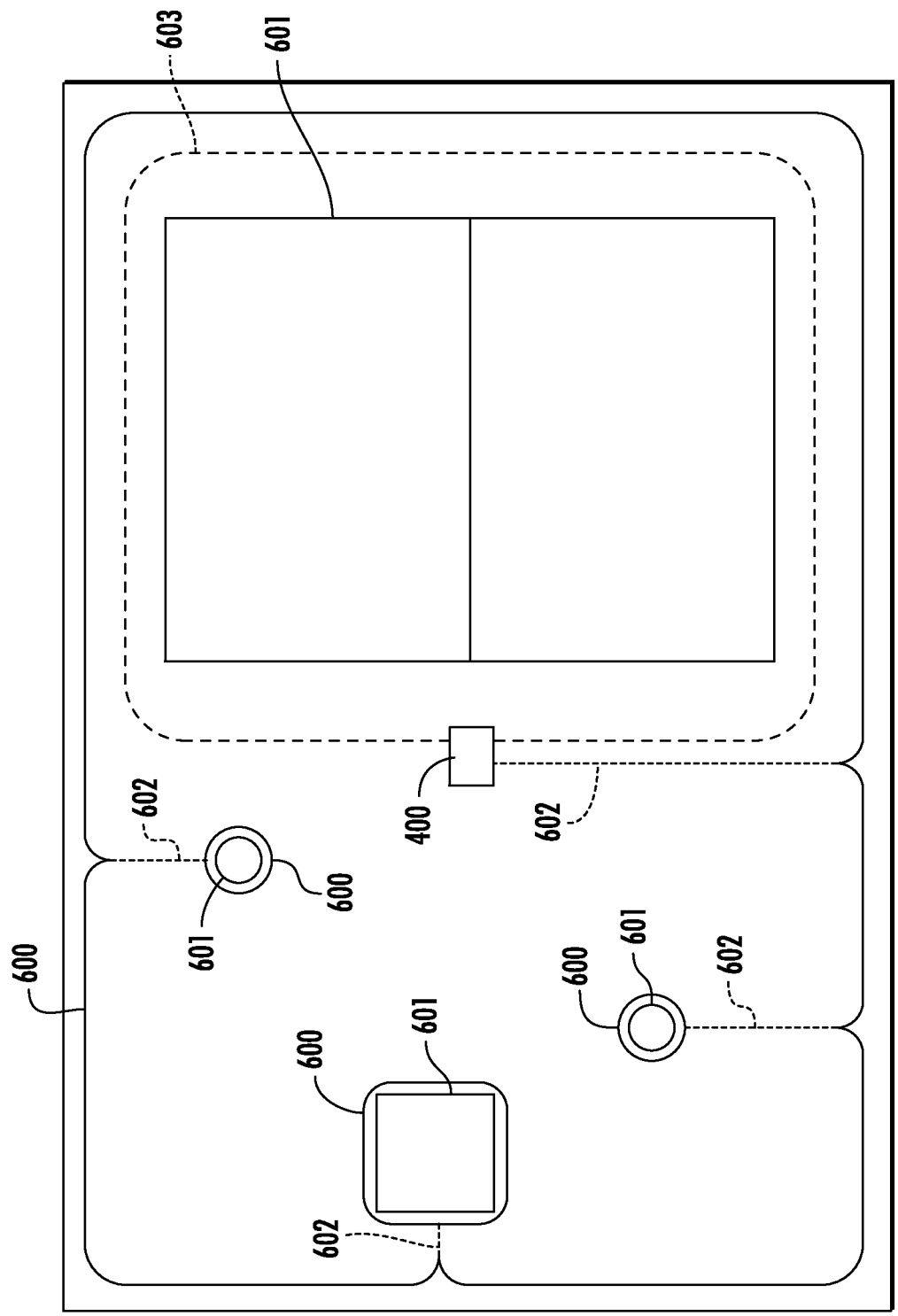
FIG. 14 is a schematic top view of a yard configured to be mowed by a robotic lawn mower.

Referring to FIGS. 1 and 2, the robotic lawn mower 100 includes the programmable controller 106, the motors 103, and one or more sensors 151-155. The robotic lawn mower 100 may be used with a guidance system like the one illustrated in FIG. 14 where a boundary wire antenna, shown as wire 600, is laid in a loop around the area where the end user requires mowing. The wire 600 may be laid atop the ground or buried. The wire 600 establishes the boundary of the area to be mowed by the robotic lawn mower 100. This wire 600 acts as an antenna and broadcasts a signal (e.g., a radio frequency signal of a first frequency, a first signal transmitting data, etc.) that is detected by a boundary detection sensor 151 onboard the robotic lawn mower 100, allowing the robotic lawn mower 100 to detect the boundaries of an area which should be mowed. If the user would like to identify an obstacle 601 (e.g., a flower bed, a building, a pond, a tree, etc.) inside the area enclosed by the exterior boundary or loop, then the boundary wire 600 may be run inside the loop, around the obstacle 601, and back to the exterior loop. If the wire 600 is in close enough proximity to itself, then the signals from both lengths of wire 600 interfere, creating a section 602 of wire 600 where no boundary signal can be received, allowing the robotic lawn mower 100 to move over this section 602 of wire 600. Additionally, a guide wire 603 may be laid through the center of narrow areas that might otherwise be difficult to navigate. The guide wire 603 emits a signal (e.g., a radio frequency signal of a second frequency different from the first frequency, a second signal transmitting data different from the data transmitted by the first signal, etc.) detected by the boundary detection sensor 151, facilitating the robotic lawn mower 100 following a specified path defined by the guide wire 603. When the programmable controller 106 receives a signal from the boundary detection sensor 151, it may control the motors 103 to run in a different direction or at a different speed, changing the direction of travel of the robotic lawn mower 100. The wire 600 and the wire 603 may be electrically coupled to the charging platform 400, which in turn supplies a current to the wire 600 and the wire 603 to produce the signals.

The robotic lawn mower 100 may incorporate a collision detection sensor 152 allowing it to detect and avoid other objects (e.g., a "bump" switch on one or more of the sides of the robotic lawn mower 100 that activates when it makes contact with another object or a distance sensor (e.g., ultrasonic, laser, etc.), etc.). Upon detection of an object in the current drive path of the robotic lawnmower 100, the programmable controller 106 is configured to change the direction and/or speed of the motors 103 to execute a turn such that the robotic lawn mower 100 continues along a new drive path, avoiding whatever object is in the current drive path. The robotic lawn mower 100 may incorporate a height sensor 153 to facilitate detection of the vertical location of the robotic lawn mower 100 relative to the ground (e.g., a light sensor that detects light that enters underneath the robotic lawn mower 100, an ultrasonic distance sensor, a switch that is actuated by touching the ground, etc.). The height sensor 153 may be coupled to the housing 107 near the front side of the robotic lawn mower 100 and configured to detect if the robotic lawn mower 100 is about to drive over a ledge or other rapid change in elevation, allowing the programmable controller 106 to steer the robotic lawn mower 100 away from the ledge. The height sensor 153 may also be used to determine the current length of the grass. The robotic lawn mower 100 may incorporate a location sensor 154 (e.g., a GPS system, a differential GPS system, an optical encoder configured to count rotations of each wheel 101, etc.) to facilitate mapping of the area. With location data from the location sensor 154 and the information from the boundary detection sensor 151, the collision detection sensor 152, and the height sensor 153, a map of the area with all the obstructions and current grass lengths may be generated by the programmable controller 106. In some embodiments, the boundary wire 600 and/or the guide wire 603 may be removed after the area has been mapped, and the robotic lawn mower 100 can use the map to determine where to mow.

Additionally, the robotic lawn mower 100 may include a gyroscopic sensor 155 configured to measure the current orientation of the robotic lawn mower 100. The programmable controller 106 is configured to use information from the gyroscopic sensor 155 to determine if the robotic lawn mower 100 has tilted beyond a certain threshold orientation (e.g., 45 degrees from horizontal, 60 degrees from horizontal, 80 degrees from horizontal, 90 degrees from horizontal, etc.), which indicates that the robotic lawn mower 100 has been picked up or fallen over. In this event, the programmable controller 106 may be configured to cease powering the motors 103 that run the cutting implements 102 to stop movement of the cutting implements 102.

Conventional robotic lawn mowers have difficulty driving in a straight line when driving in a direction near perpendicular to the grade of a slope due to the effect of gravity. Using heading information from the gyroscopic sensor 155 or wheel slip information from the optical encoders and GPS, the programmable controller 106 may be configured to detect a deviation from the desired direction of travel or from the desired path and modulate the power delivered to each wheel in order to modify the course and/or eliminate any wheel slippage. As conventional robotic lawn mowers drive, the charge on their fixed batteries continuously decreases, resulting in a continuous decrease in the maximum grade of hill they can scale. Because the battery management system 219 can selectively draw power from one or more different battery modules 201, the robotic lawn mower 100 can climb steep hills, even after long periods of operation. For example, the battery management system 219 could save one fully charged battery module 201 while driving on level ground and use it when it encounters a steeper slope. The battery management system 219 may be configured to draw from this reserve battery module 201 when the programmable controller 106 determines (e.g., using information from the gyroscopic sensor 155 or from the location sensor 154) that the robotic lawn mower 100 has deviated from the desired direction of travel along a desired path by at least a threshold angle. Alternatively, the battery management system 219 may be configured to draw from this reserve battery module 201 when the programmable controller 106 determines (e.g., using information from the gyroscopic sensor 155) that the orientation of a robotic lawnmower is within a predetermined range (e.g., indicative of a slope having at least a threshold grade).

The robotic lawn mower 100 includes the user interface 218 to display information to the user and receive control inputs from the user. In some embodiments, the user interface 218 includes a display screen and one or more user input devices (e.g., switches, buttons, key-switches, dials, etc.). In some embodiments, the display screen is a touch screen display that both displays information to the user and receives user inputs. In some embodiments, the user interface 218 includes an application installed onto a computer, smartphone, tablet, or other device. Such a device may connect to the programmable controller 106 through a wired connection or through a wireless connection (e.g., Bluetooth, Wi-Fi, infrared, etc.). In some embodiments, the user interface 218 provides the user with information related to the operation of the robotic lawn mower 100. By way of example, the user interface 218 may indicate the state of charge of the battery modules 201, the run time provided by the battery modules 201, or the current status of the robotic lawn mower 100 (e.g., operating, charging, etc.) or alert the user if the robotic lawn mower 100 needs maintenance or needs user intervention in the event of being stuck, etc. The user interface 218 can also receive inputs from the user to control the robotic lawn mower 100. By way of example, the user interface 218 may allow the user to select between various cutting heights, issue run and stop commands, develop a schedule for when the robotic lawn mower 100 will operate, or to tell the robotic lawn mower 100 to return to the charging platform 400.

Figure 15:
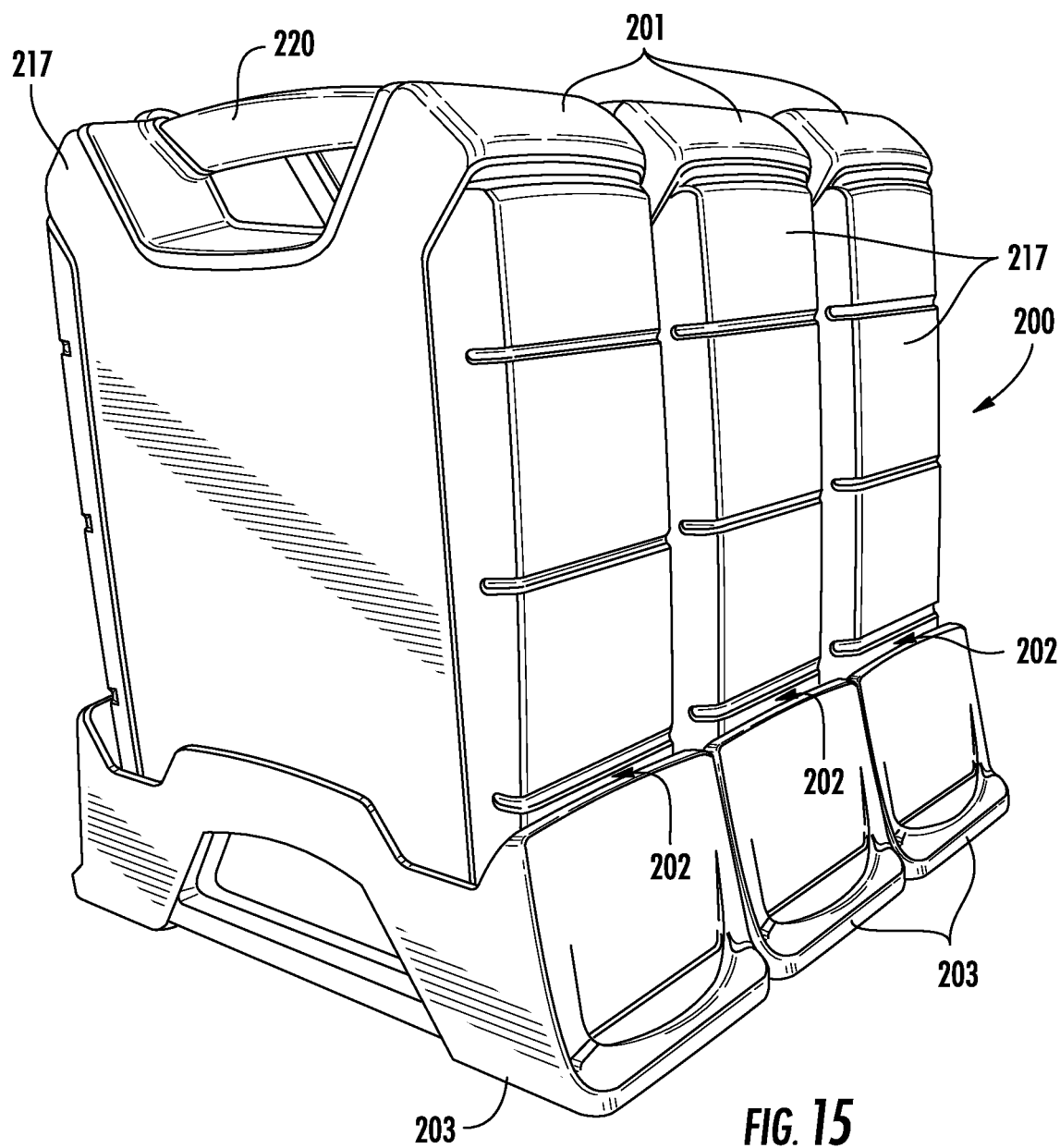
FIG. 15 is a perspective view of a series of battery modules engaged with a series of bases, according to an exemplary embodiment.
Figure 16:
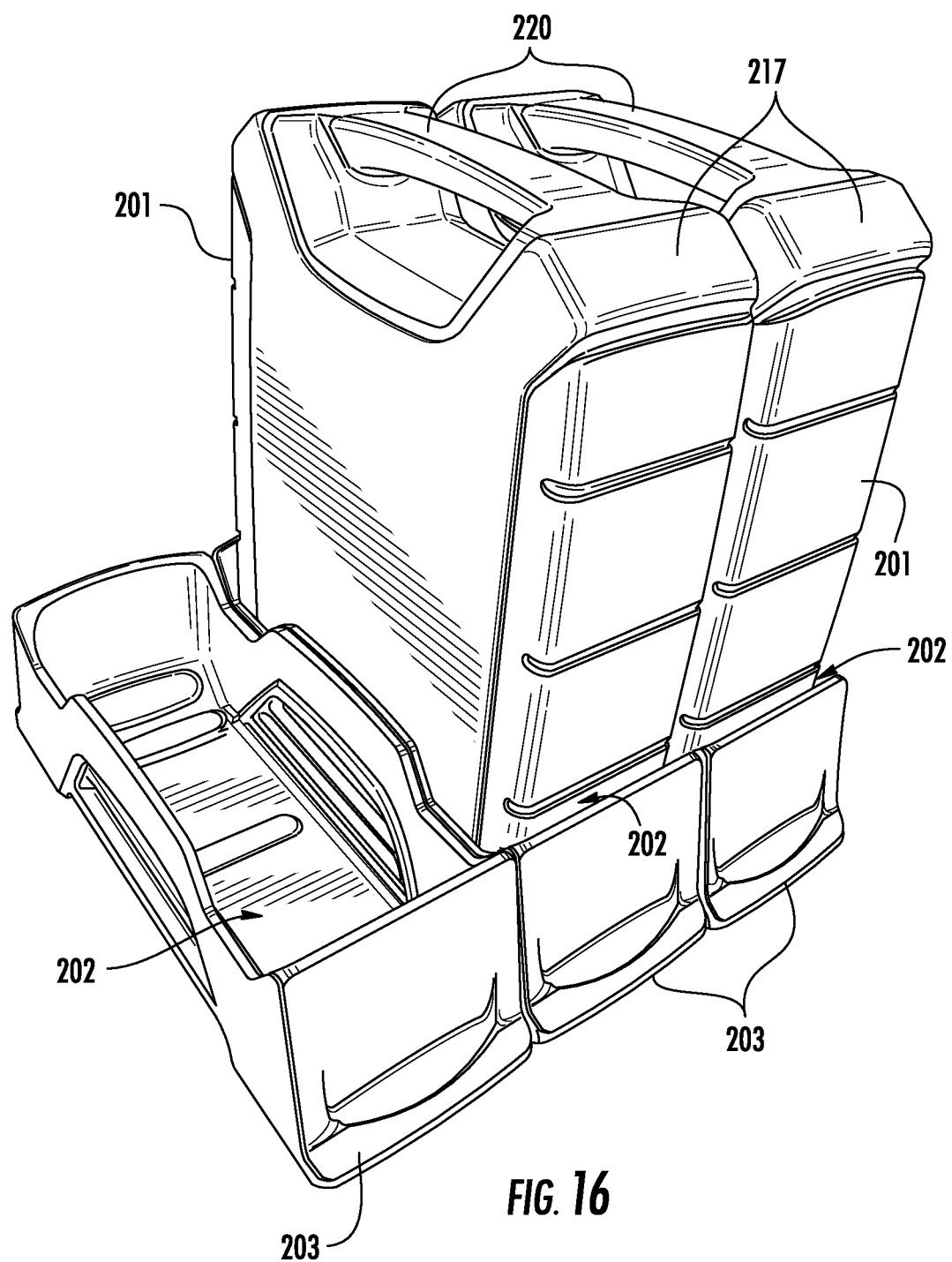
FIG. 16 is a perspective view of the battery modules and the bases of FIG. 15 with one of the battery modules removed.

Referring to FIGS. 15 and 16, an alternative embodiment of the user-scalable power system 200 is shown. In this embodiment, each battery module 201 is associated with a separate base 203 having a receptacle 202. The bases 203 are arranged with the receptacles 202 opening upward such that the battery modules 201 may each be removed by lifting the battery modules 201 vertically out of the receptacles 202. To facilitate manual portability, each of the battery modules 201 includes a grip or handle 220 arranged along an upper surface of the battery module 201. The battery modules 201 may be removed individually and in any order. In some embodiments, the bases 203 include a locking mechanism 210 that holds the battery modules 201 within the receptacle 202. By way of example, the locking mechanism 210 may include a latch (e.g., similar to the latch 215) that is configured to selectively engage a portion of the battery module 201, holding the battery module 201 within the receptacle 202. In other embodiments, the bases 203 are rotated such that the receptacles 202 open in a direction other than directly upwards. In such embodiments, the locking mechanisms 210 facilitate holding the battery modules 201 in place regardless of the force of gravity on the battery modules 201.

Each base 203 may be used separately, or multiple bases 203 may be used in combination to provide the capacity for a greater number of battery modules 201. Accordingly, the number of bases 203 may be adjusted to suit the power needs of a particular application, either during production or by the end user. By way of example, a relatively small number of bases 203 may be provided on a robotic lawn mower 100 when the end user has a relatively small lawn and, as such, the robotic lawn mower 100 is only required to run for a relatively short period of time. In some embodiments, additional bases 203 may be added to the robotic lawn mower 100 to allow a greater number of battery modules 201 to be connected at a given time, increasing the maximum total energy capacity of the robotic lawn mower 100.

The bases 203 shown in FIGS. 15 and 16 may cooperate with the battery modules 201 to power a piece of power equipment (e.g., the robotic lawn mower 100, a leaf blower, a chain saw, etc.). In such embodiments, the receptacle 202 of each base 203 includes components that electrically couple the battery modules 201 to the power equipment (e.g., contacts 204, etc.). Alternatively, the bases 203 shown in FIGS. 15 and 16 may each be configured as a standalone charger similar to the standalone charger 500 or may be coupled together and configured as a standalone charging bank. Accordingly, in some embodiments, one or more of the bases 203 include an electrical cord to connect them to the electrical grid and a transformer, rectifier, or other voltage control device. In some configurations, the one or more bases 203 may include voltage regulation circuits to allow the robotic lawn mower 100 to be connected directly to the grid via the electrical cord. The receptacles 202 may also include electrical contacts 204 to facilitate electrically coupling to the battery modules 201.

Figure 17:
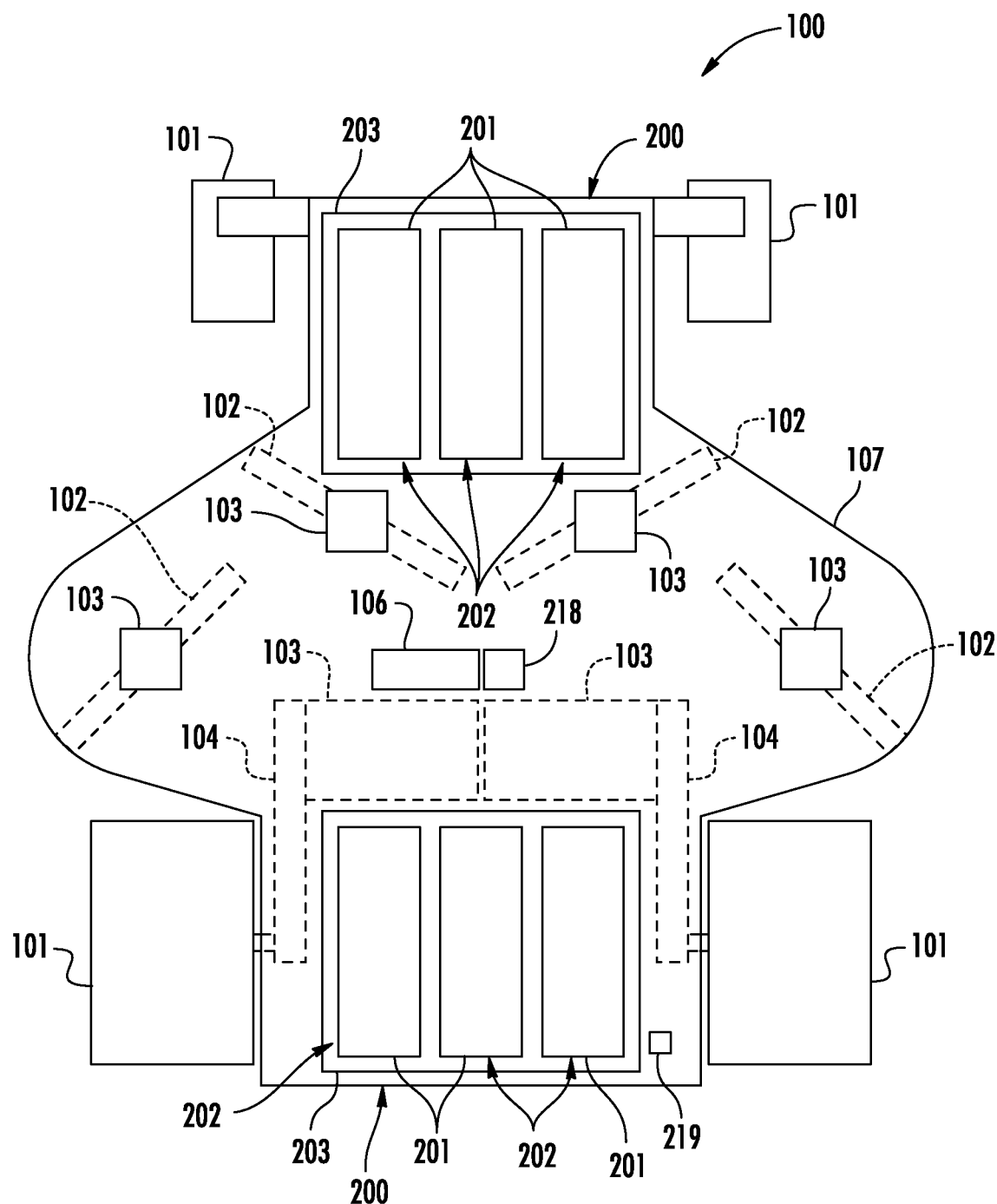
FIG. 17 is a schematic top view of a robotic lawn mower, according to another exemplary embodiment.
Figure 18:
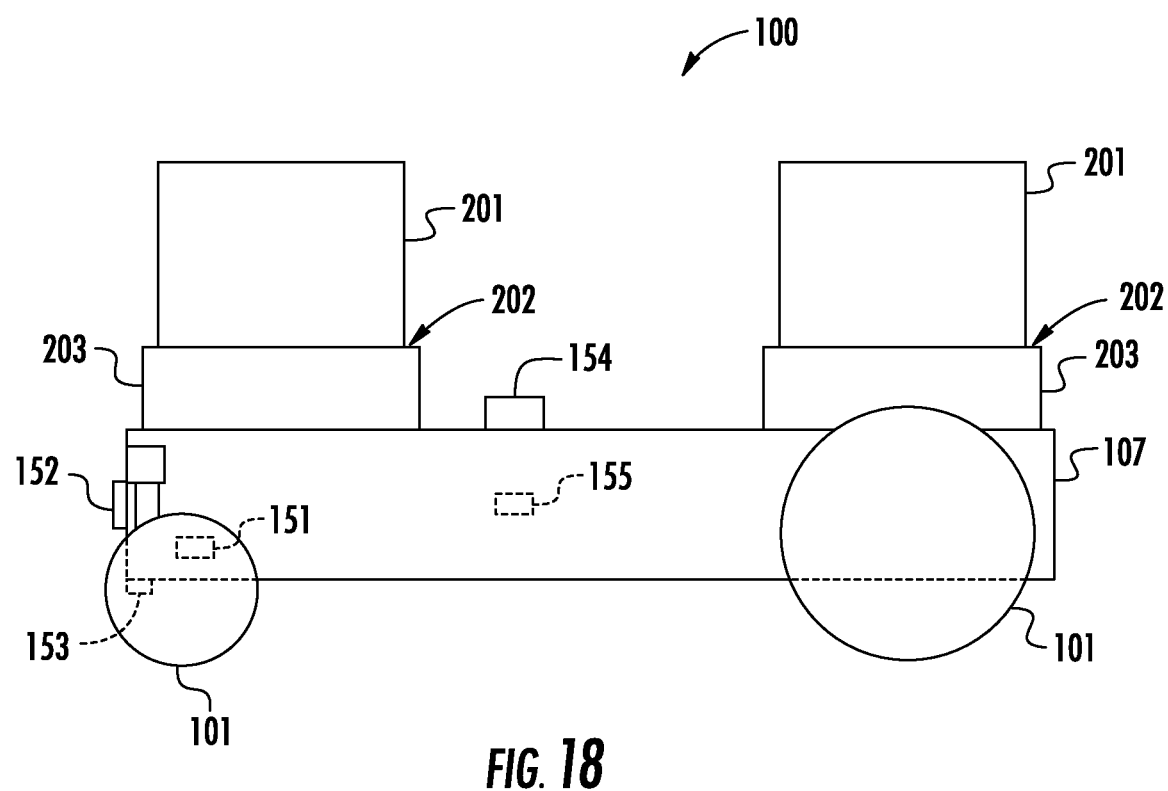
FIG. 18 is a schematic side view of the robotic lawn mower of FIG. 17.

FIGS. 17 and 18 illustrate a robotic lawn mower 100 according to another exemplary embodiment. This robotic lawn mower 100 is configured for commercial or premium residential applications. Consequently, the robotic lawn mower 100 shown in FIGS. 17 and 18 is larger than the robotic lawn mower 100 shown in FIGS. 1 and 2, which is configured for standard residential applications. The robotic lawn mower 100 shown in FIGS. 17 and 18 includes components similar to those of the robotic lawn mower 100 shown in FIGS. 1 and 2, however, the robotic lawn mower 100 shown in FIGS. 17 and 18 includes a larger number of cutting implements 102 to facilitate cutting grass at a faster rate (i.e., requiring a shorter period of time to cut a given area of grass). The robotic lawn mower 100 shown in FIGS. 17 and 18 utilizes the battery modules 201 shown in FIGS. 15 and 16, however, each base 203 in this embodiment has three receptacles 202 and is configured to hold up to three battery modules 201. The robotic lawn mower 100 shown in FIGS. 17 and 18 includes a pair of bases 203, each substantially evenly spaced about the center of gravity of the robotic lawn mower 100. Alternatively, a robotic lawnmower 100 may include a base 203 and/or one or more receptacles 202 approximately centered about the center of gravity of the robotic lawn mower 100.

Figure 19:
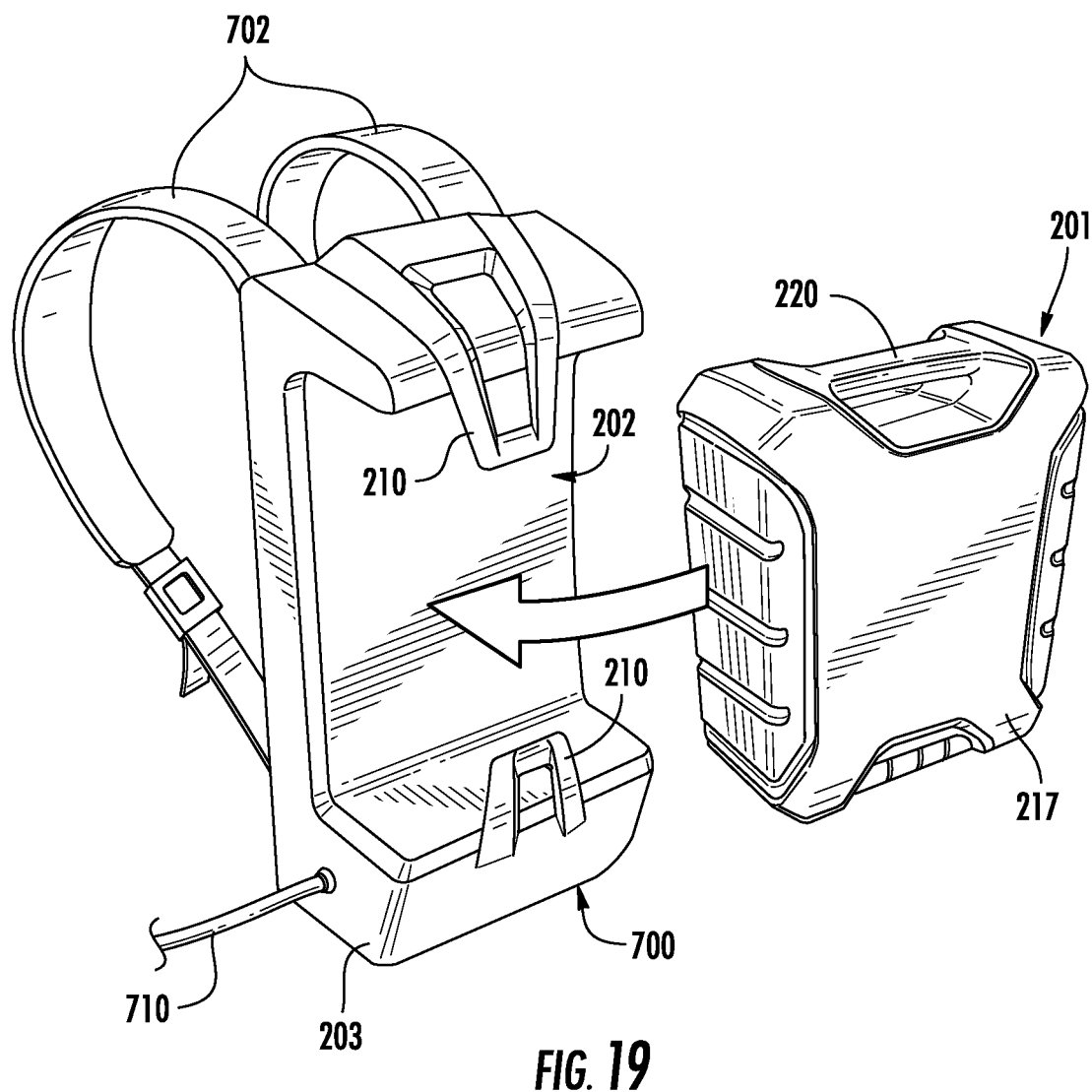
FIG. 19 is a perspective view of a standalone power supply configured for use with the battery modules of FIG. 15, according to an exemplary embodiment.
Figure 20:
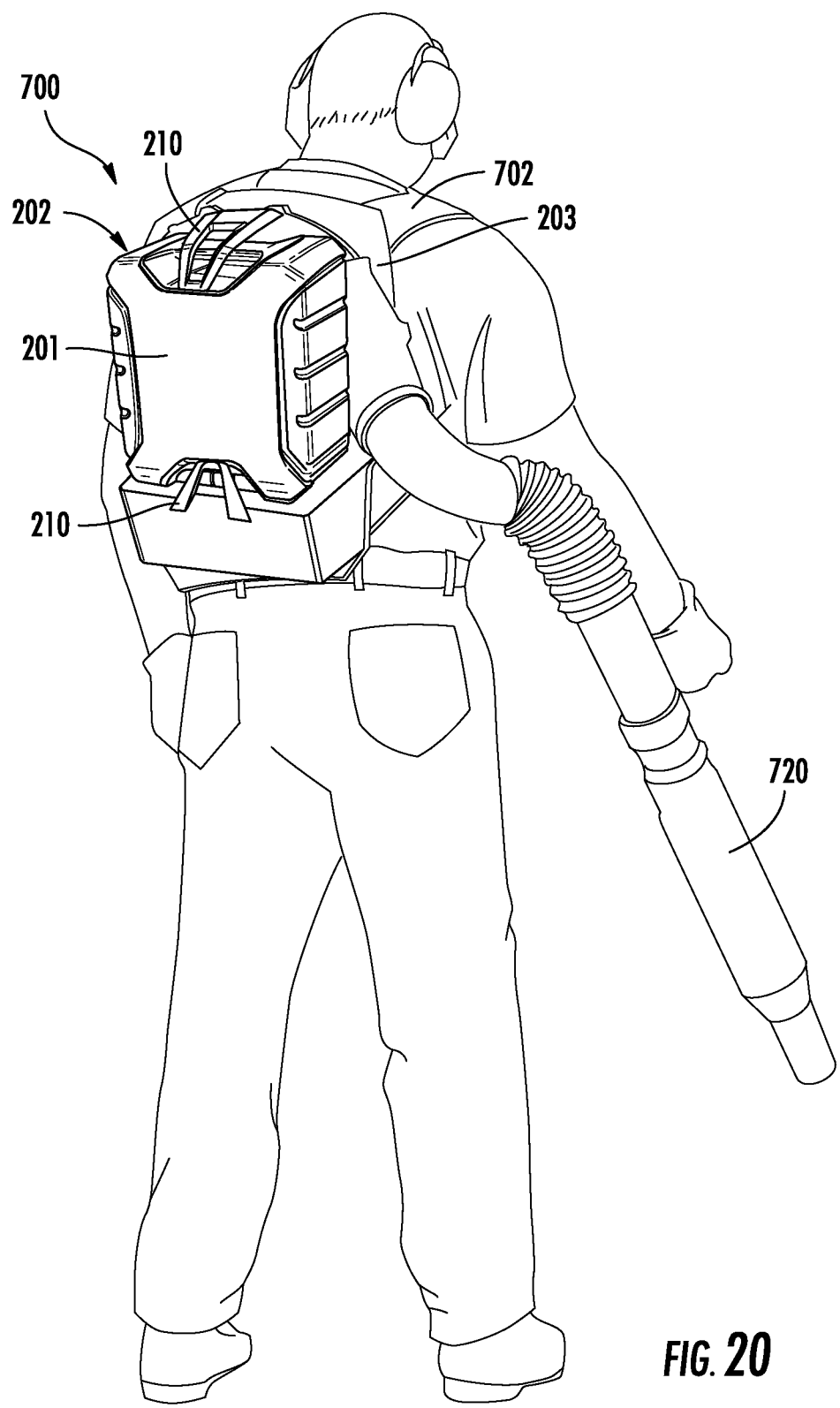
FIG. 20 is a perspective view of a standalone power supply configured to power a leaf blower, according to an exemplary embodiment.

Referring to FIGS. 19 and 20, a stand-alone power supply 700 configured for use with the battery modules 201 shown in FIGS. 15 and 16 is illustrated according to an exemplary embodiment. The power supply 700 may be able to supply power to devices of the user's choosing (e.g., via one or more standard electrical outlets) or may be designed for use to power a particular piece or family of equipment (e.g., hand-held power tools such as leaf blowers, string trimmers, etc.).

Power supply 700 includes a base 203 and at least one receptacle 202. As illustrated, the base 203 is configured as a backpack and includes straps 702 that allow a user to carry the power supply 700 on his back. In some embodiments, due to weight limitations, a backpack power supply 700 includes a single receptacle 202 for receiving a single battery module 201. The base 203 includes one or more locking mechanisms 210 to secure the battery module 201 to the receptacle 202. In the embodiment shown, the locking mechanisms 210 are clips that engage an indentation in the outer shell 217 of the battery module 201. As illustrated the power supply 700 includes a cord 710 for providing power to a hand-held power tool. In some embodiments, the cord 710 is configured to selectively electrically couple to the power tool through a standard electrical outlet such that various hand-held power tools may be coupled to the same power supply 700. In the embodiment shown in FIG. 20, the hand-held power tool is a leaf blower 720. A portion of the leaf blower 720 (e.g., an electric motor, an impeller, a fan shroud, etc.) is integrated into the base 203. Accordingly, the cord 710 may be omitted, and the power supply 700 may be directly electrically coupled to the leaf blower 720. Alternatively, or additionally, the power supply 700 can include one or more standard electrical outlets, allowing the user to plug in and power electrical devices of his choosing (e.g., computers, laptops charging systems for cell phones or other portable devices, radios, etc.).

In one exemplary embodiment, a homeowner utilizes an outdoor power equipment system to facilitate total outdoor care of their property. The homeowner may set up a robotic lawn mower 100 (e.g., the robotic lawn mower 100 shown in FIGS. 1 and 2) along with a charging station 400. The homeowner may choose to bury or otherwise lay a wire 600 and a wire 603 to facilitate controlled operation of the robotic lawn mower 100. The homeowner may then set up an operating schedule for the robotic lawn mower 100 using the user interface 218 on a smartphone or other user device such that the robotic lawn mower 100 regularly and autonomously mows the lawn. The homeowner may have a charger 500 setup in their home to charge a spare battery module 201 for use with the leaf blower 300, a string trimmer, a chain saw, or another piece of portable outdoor power equipment. The homeowner may use the portable outdoor power equipment and the robotic lawn mower 100 may operate simultaneously. Alternatively, the homeowner may remove the battery modules 201 from the robotic lawn mower 100 for use with the portable power equipment when the robotic lawn mower is not in use.

In another exemplary embodiment, a commercial lawn care service utilizes an outdoor power equipment system to facilitate total outdoor care of a property using only a small number of employees. One employee may arrive at a job site with one or more robotic lawn mowers 100 (e.g., the robotic lawn mower 100 shown in FIGS. 17 and 18), where the number of robotic lawn mowers 100 may be varied to correspond to the size of the lawn being maintained. The employee may setup the robotic lawn mowers 100 to begin cutting the grass autonomously. After the robotic lawn mowers 100 are activated, the employee may simultaneously use the power supply 700 to complete other outdoor tasks. By way of example, the employee may use the leaf blower 720 to blow leaves into an organized pile. By way of another example, the employee may connect the power supply 700 to a chainsaw and prune trees or break down fallen tree limbs. By way of yet another example, the employee may connect the power supply 700 to a hedge trimmer and shape shrubberies.

To facilitate extended outdoor care sessions, the employee may bring one or more chargers (e.g., the charging platform 400, the standalone charger 500, charging banks as shown in FIGS. 15 and 16, etc.) and additional battery modules 201. The chargers may be connected to the electrical grid (e.g., through an electrical cord and a standard power outlet), or the vehicle used to transport the robotic lawn mowers 100 may be outfitted with a generator (e.g., a gasoline generator, a natural gas generator, etc.). Accordingly, the battery modules 201 may be charged while the outdoor tasks are performed, and the discharged battery modules 201 can then be exchanged for charged ones as needed. The robotic lawn mowers 100 may communicate to the employee that the battery modules 201 should be exchanged after the battery management system 219 determines that the battery modules 201 are sufficiently depleted. By way of example, the programmable controller 106 may issue a notification to the user interface 218 (e.g., a smartphone or other user device) to indicate that the battery modules 201 should be exchanged. By way of another example, the robotic lawn mower 100 may be configured to automatically return to a certain location (e.g., to the vehicle used to transport the robotic lawn mowers 100, to a predetermined location such as a driveway or property line, etc.) to indicate that the battery modules 201 should be exchanged. The depleted battery modules 201 may then be exchanged for charged ones and recharged. Alternatively, the robotic lawn mowers 100 may each return to a charging platform 400 automatically (e.g., when the battery modules 201 are depleted, when maintenance of the lawn is complete, in response to a user command through the user interface 218, etc.). The charging platforms 400 may be coupled to a trailer of the vehicle to facilitate transportation and minimize setup time of the charging platforms 400.

Figure 21:
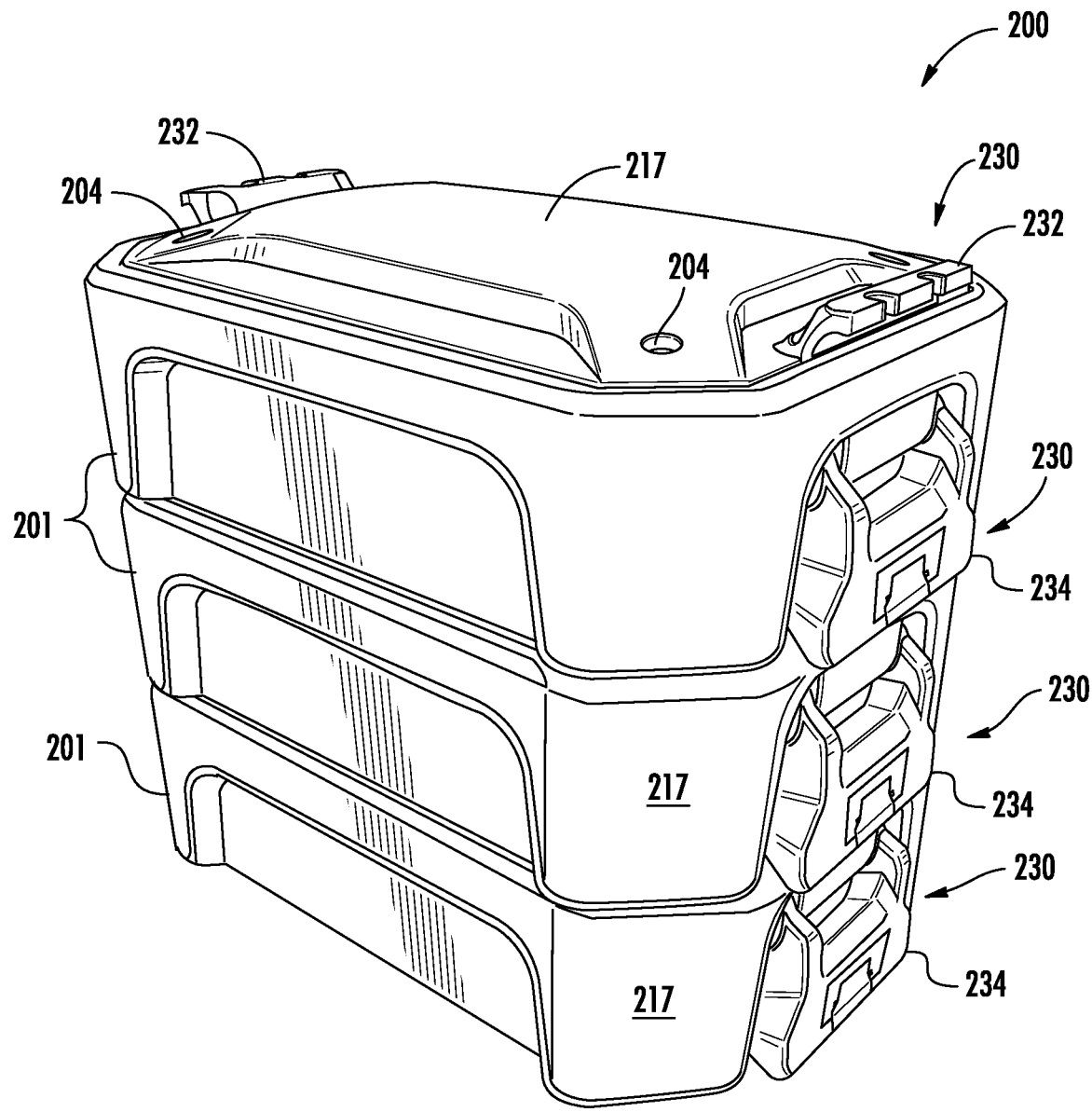
FIG. 21 is a perspective view of a series of battery modules, according to another exemplary embodiment.

Referring to FIG. 21, the battery modules 201 are shown according to another exemplary embodiment. In this embodiment, the battery modules 201 are configured to be stacked atop one another. The battery modules 201 each include a set of female contacts 204 arranged along a top surface of the battery module 201 and a set of male contacts 204 arranged along a bottom surface of the battery module 201. Accordingly, as a battery module 201 is stacked atop another battery module 201, the male and female contacts 204 engage, electrically coupling the battery modules 201 together (e.g., in parallel, in series, etc.). The battery modules 201 may be stacked atop a base 203. Such a base 203 may include female contacts 204 configured to engage the male contacts 204 of the bottommost battery module 201.

The top surface of each battery module 201 is raised, and the bottom surface of each battery module is recessed, such that the battery modules 201 automatically engage and center themselves when stacked. Once centered, the battery modules 201 may be coupled to one another using a set of locking mechanisms, shown as locking mechanisms 230. Each locking mechanism 230 includes a catch 232 extending laterally outward from the corresponding battery module 201 and a latch 234 rotatably coupled to the corresponding battery module 201. The latch 234 for one battery module 201 is configured to rotate to selectively engage the catch 232 of an adjacent battery module 201, coupling the battery modules 201 together. In some embodiments, the base 203 includes a set of catches 232 configured to engage the latches 234 of the bottommost battery module 201.

Each of the battery modules 201 described herein may be configured in a variety of ways depending upon the desired application (e.g., the type of power equipment being used, the power input (e.g., voltage, current, etc.) required by the power equipment, the desired runtime of the power equipment, etc.). In one configuration, the battery module 201 includes seventy-eight cells. Each cell 207 is rated at 3.6 volts and 2.5 amp-hours. The battery module 201 arranges the cells 207 in a 13S6P configuration with 13 cells 207 connected in series in a group and six groups of cells 207 connected in parallel. The series configuration yields a system voltage of 46.8 volts for the battery module 201. The six parallel configuration yields fifteen amp-hours capacity for the battery module 201. The combination of the two provides 702 watt-hours of energy capacity for the battery pack.

In some embodiments, the battery module 201 has the cells 207 arranged in multiple layers. For a 13S6P configuration battery module 201, each layer includes cells 207 arranged in six groups and the battery module 201 includes two layers of cells.

In an alternative embodiment, the cells 207 are arranged in a single layer with six groups of thirteen cells 207 each. In a scalable power system 200 using four of the 13S6P configuration battery modules 201, the total energy capacity would be 2808 watt-hours (2.8 kilowatt-hours). In this embodiment the battery module 201 weighs about 10.75 pounds and is substantially shaped like a cube.

In another configuration, the battery module 201 includes eighty-four cells 207 arranged in a 14S6P configuration. Using cells 207 rated at 3.6 volts and 2.5 amp-hours, this configuration yields a voltage of 50.4 volts, 15 amp-hours of capacity and 756 watt-hours of energy capacity. In other embodiments using cells 207 rated at 3.9 volts and 2.5 amp-hours, the 13S6P arrangement would yield a voltage of 50.7 volts, 15 amp-hours of capacity, and 760.5 watt-hours of energy. In the 14S6P configuration, the voltage would be 54.6 volts, 15 amp-hours of capacity, and 819 watt-hours of energy.

In another configuration, the battery module 201 includes one hundred cells 207 arranged in a 20S5P configuration having five groups of twenty cells 207 each. Each group or row of twenty cells 207 is welded or otherwise connected together in series (e.g., by conductors), and each of the five groups of twenty cells 207 is welded or connected together in parallel (e.g., by conductors). The cells 207 used in the battery pack may be 18650 form factor cylindrical cells 207 (18 millimeter diameter and 65 millimeter length). These cells 207 may be available in 3.2 amp-hours, 2.9 amp-hours, 2.5 amp-hours, and other cell ratings. Using cells 207 rated at 3.6 volts, and 3.2 amp-hours, a 20S5P configuration battery module provides a voltage of 72 volts, 16 amp-hours of capacity, and 1152 watt-hours of energy. Using cells 207 rated at 3.6 volts, and 2.9 amp-hours, a 20S5P configuration battery module provides a voltage of 72 volts, 14.5 amp-hours of capacity, and 1044 watt-hours of energy. Using cells 207 rated at 3.6 volts and 2.5 amp-hours, a 20S5P configuration battery pack provides a voltage of 72 volts, 12.5 amp-hours of capacity, and 900 watt-hours of energy.

In some embodiments, the battery module 201 provides about one kilowatt-hour of energy (e.g., between 800 watt-hours and 1.2 kilowatt-hours) and weighs less than twenty pounds. End products powered by the scalable power system 200 may scale in increments that can be measured in kilowatt-hours of energy. For example, a standard residential lawn mower may require between two and three kilowatt-hours of energy capacity and a premium residential lawn mower may require between three and four kilowatt-hours of energy capacity. Battery modules 201 that provide about one kilowatt-hour of energy and weigh less than twenty pounds allow the end user to easily choose between a standard configuration and premium configuration of the lawn mower 100 or other end product by providing a reasonable number of battery modules 201 to achieve either configuration and battery modules 201 of a size and weight that can be easily manipulated as needed by the end user. The battery modules 201 are interchangeable between different pieces of equipment each equipped with the scalable power system 200 (e.g., between a lawn mower, a leaf blower, a string trimmer, etc.).

Figure 5:
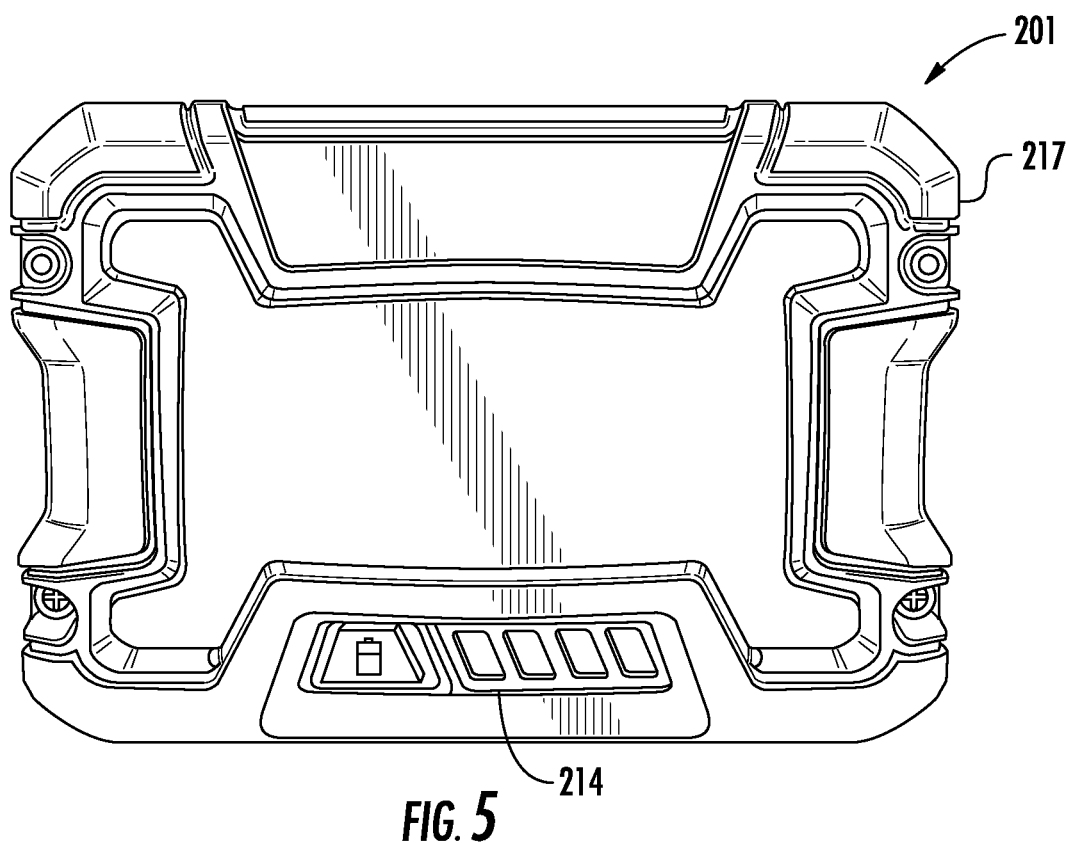
FIG. 5 is a front view of a battery module for use with the robotic lawn mower of FIG. 1 and the leaf blower of FIG. 3, according to an exemplary embodiment.
Figure 6:
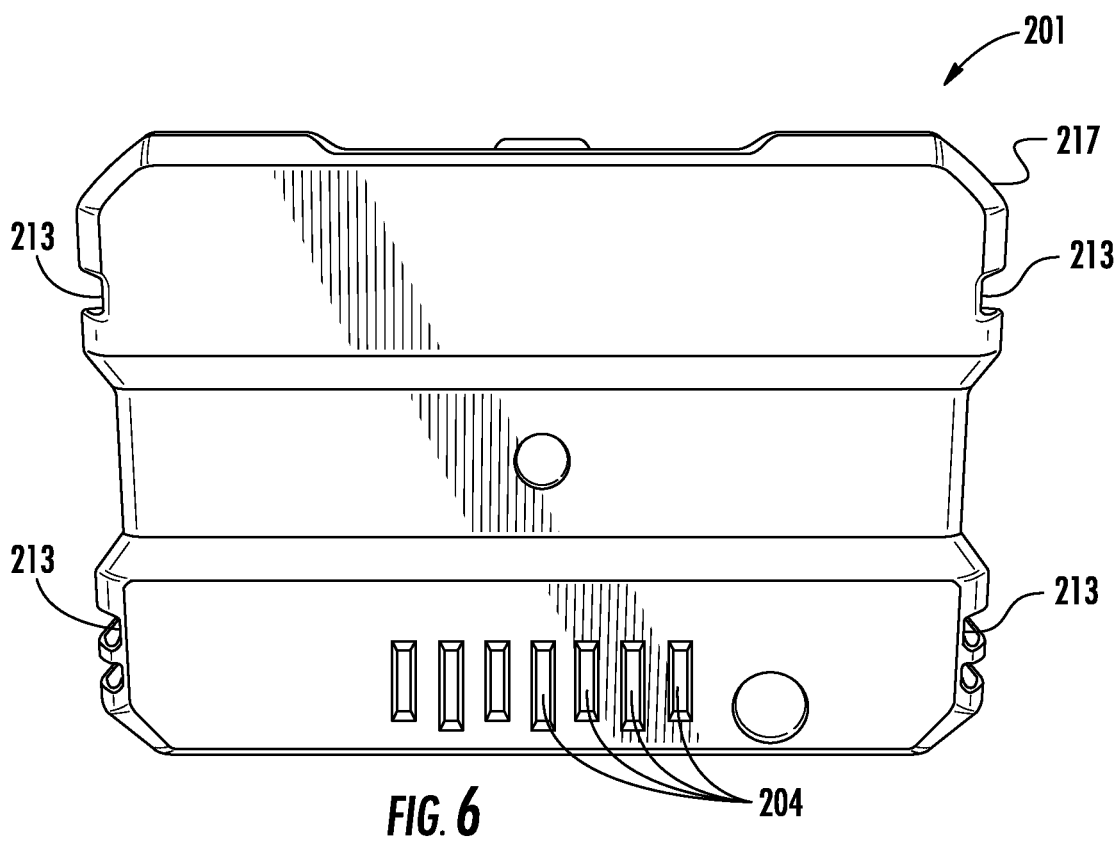
FIG. 6 is a rear view of the battery module of FIG. 5.

In the embodiment shown in FIGS. 5-7, the battery module 201 includes twenty cells 207 arranged in a 20S1P configuration. Using cells 207 rated at 4.1 volts (3.6 volts nominal) and 2.0 amp-hours, this configuration yields a voltage of 82 volts (72 volts nominal), 2.0 amp-hours of capacity and 144 watt-hours of energy capacity. In this embodiment, the battery module 201 weighs about 3.31 pounds and can be charged to 50 percent in 13 minutes and to 100 percent in 30 minutes. In an alternative embodiment, the battery module 201 includes forty cells 207 arranged in a 20S2P configuration. Using cells 207 rated at 4.1 volts (3.6 volts nominal) and 2.0 amp-hours, this configuration yields a voltage of 82 volts (72 volts nominal), 4.0 amp hours of capacity, and 288 watt-hours of energy capacity. In this embodiment, the battery module 201 weighs about 5.73 pounds and can be charged to 50 percent in 25 minutes and to 100 percent in 60 minutes. Another alternative embodiment is contemplated using a similar structure that provides 5.0 amp-hours of capacity and 360 watt-hours of energy capacity. In this embodiment, the battery module 201 can be charged to 50 percent in 32 minutes and to 100 percent in 75 minutes.

In another embodiment, the battery modules 201 have a weight of approximately 13-15 pounds. In this embodiment, the battery modules 201 are each 1 kW battery packs. In yet another embodiment, the battery module 201 is an 80-volt lithium ion battery pack that is smaller in both physical size and capacity as compared to the battery module 201 of the previous embodiment. It is contemplated that different sized battery modules 201 could be utilized while operating within the scope of the present disclosure. In some embodiments, each of the battery modules 201 has the same physical size and electrical capacity. In other embodiments, different types of battery modules of various sizes are utilized in place of the battery modules 201 or along with one or more of the battery modules 201. By way of example, the any of the battery modules 201 shown in FIGS. 5-7, the battery modules 201 shown in FIGS. 15 and 16, and the battery modules 201 shown in FIG. 21 may be used together.

Figure 22:
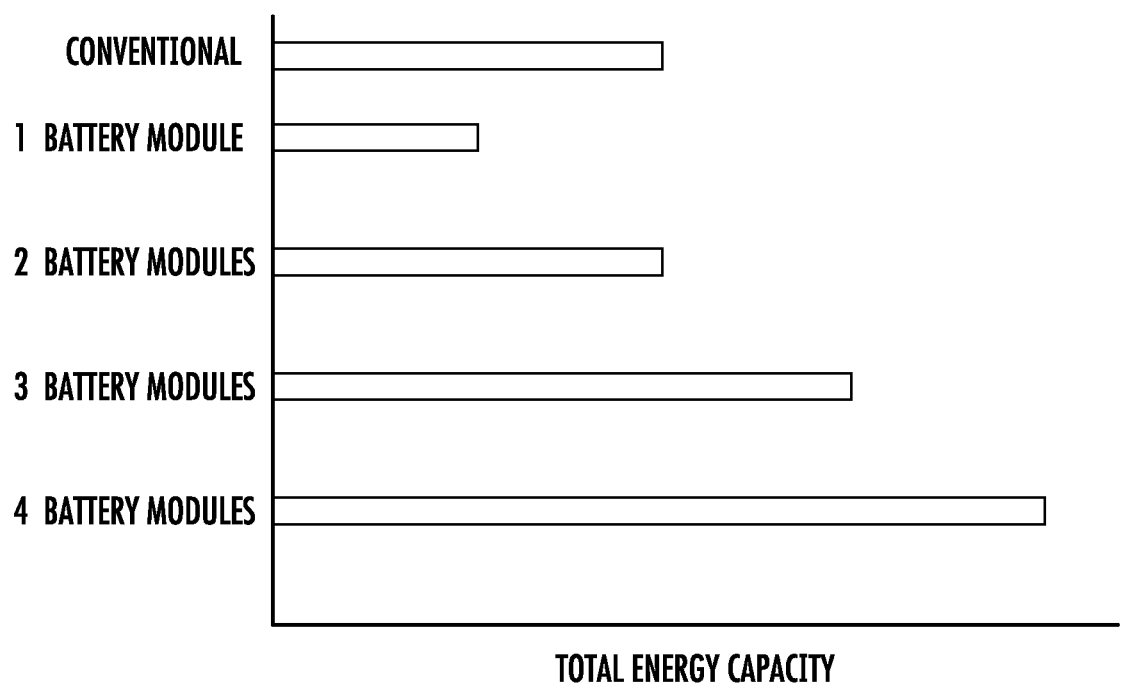

FIG. 22 illustrates the advantages of the scalable power system 200 relative to a conventional power system that includes only one battery module that cannot be removed without the use of tools. Because the battery module of a conventional power system is fixed, a conventional power system has a fixed total energy capacity. In contrast, the scalable power system 200 allows a piece of power equipment (e.g., the robotic lawn mower 100) to be selectively outfitted with a variable quantity of battery modules 201, depending on the desired end use. Accordingly, the total energy capacity of the scalable power system 200 can be scaled up or down by adding or removing battery modules 201. This allows the same piece of power equipment to be suitable for a variety of applications and end users. Additionally, the ability to scale the number of power supplies also allows the user to manage the overall weight of the piece of power equipment by using fewer of the removable battery modules. In contrast, conventional power equipment using a fixed battery module also has a fixed weight.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges or geometric relationships provided. Accordingly, these terms should be interpreted as indicating that insubstantial or inconsequential modifications or alterations of the subject matter described and claimed are considered to be within the scope of the invention as recited in the appended claims It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

What is claimed is:
1. A robotic lawn mower, comprising:
a first wheel driven by a first electric wheel motor;
a second wheel driven by a second electric wheel motor;
a cutting implement driven by an electric cutting implement motor;
a power system for powering the electric wheel motors and the electric cutting implement motor, the power system comprising:

a plurality of removable rechargeable battery modules;
a plurality of receptacles, each receptacle being configured to receive one of the plurality of battery modules; and
a battery management system configured to control discharging of each of the plurality of battery modules, wherein the battery management system is configured to control which of the plurality of battery modules supply current to a power bus so that the power system is operable when an additional battery module is installed within an open receptacle that defines a different charge level than at least one of the removable rechargeable battery modules received within the plurality of receptacles; and
a controller configured to control operation of the electric wheel motors and the electric cutting implement motor to autonomously mow a yard.

2. The robotic lawn mower of claim 1, wherein the battery modules are removable from the receptacles without the use of tools.

3. The robotic lawn mower of claim 1, wherein each battery module is rated at less than 100 volts.

4. The robotic lawn mower of claim 1, wherein each battery module weighs six pounds (2.72155 kilograms) or less.

5. The robotic lawn mower of claim 1, wherein the robotic lawn mower weighs sixty pounds (27.2155 kilograms) or less.

6. The robotic lawn mower of claim 1, further comprising:
a boundary detection sensor configured to receive a signal from a boundary wire antenna;
wherein the controller is configured to control operation of the electric wheel motors to keep the robotic lawn mower within a boundary established by the boundary wire antenna.

7. The robotic lawn mower of claim 1, further comprising:
a collision detection sensor configured to detect an object in a drive path of the robotic lawn mower;
wherein the controller is configured to control operation of the electric wheel motors to turn the robotic lawn mower onto a new drive path away from the object detected by the collision detection sensor.

8. The robotic lawn mower of claim 1, further comprising:
a gyroscopic sensor configured to detect an orientation of the robotic lawn mower;
wherein the controller is configured to stop operation of the electric cutting implement motor upon detection by the gyroscopic sensor of the orientation exceeding a predetermined threshold value.

9. The robotic lawn mower of claim 1, further comprising:
a gyroscopic sensor configured to detect an orientation of the robotic lawn mower; and
a location sensor configured to determine a location of the robotic lawn mower;
wherein the controller is configured to provide additional power from the power system to one or both of the electric wheel motors based on at least one of (a) detection of a deviation by the robotic lawn mower from a desired path to maintain the robotic lawn mower on the desired path based on the location of the robotic lawn mower as determined by the location sensor and (b) detection of the orientation exceeding a predetermined threshold value.

10. The robotic lawn mower of claim 1, further comprising:
a location sensor configured to determine a location of the robotic lawn mower;
wherein the controller is configured to map an area mowed by the robotic lawn mower using location data collected by the location sensor.

11. A robotic lawn mower, comprising:
a first wheel driven by a first electric wheel motor;
a second wheel driven by a second electric wheel motor;
a cutting implement driven by an electric cutting implement motor;
a power system for powering the electric wheel motors and the electric cutting implement motor, the power system comprising:
a plurality of removable rechargeable battery modules; and
a plurality of receptacles, each receptacle being configured to receive one of the plurality of battery modules;
a controller configured to control operation of the electric wheel motors and the electric cutting implement motor to autonomously mow a yard;
a gyroscopic sensor configured to detect an orientation of the robotic lawn mower; and
a location sensor configured to determine a location of the robotic lawn mower; wherein the controller is configured to provide additional power from the power system to one or both of the electric wheel motors based on at least one of (a) detection of a deviation by the robotic lawn mower from a desired path to maintain the robotic lawn mower on the desired path based on the location of the robotic lawn mower as determined by the location sensor and (b) detection of the orientation exceeding a predetermined threshold value.

12. The robotic lawn mower of claim 11, wherein the battery modules are removable from the receptacles without the use of tools.

13. The robotic lawn mower of claim 11, wherein each battery module is rated at less than 100 volts.

14. The robotic lawn mower of claim 1, wherein each battery module weighs six pounds (2.72155 kilograms) or less.

15. The robotic lawn mower of claim 11, wherein the robotic lawn mower weighs sixty pounds (27.2155 kilograms) or less.

16. The robotic lawn mower of claim 11, further comprising:
a boundary detection sensor configured to receive a signal from a boundary wire antenna;
wherein the controller is configured to control operation of the electric wheel motors to keep the robotic lawn mower within a boundary established by the boundary wire antenna.

17. The robotic lawn mower of claim 11, further comprising:
a collision detection sensor configured to detect an object in a drive path of the robotic lawn mower;
wherein the controller is configured to control operation of the electric wheel motors to turn the robotic lawn mower onto a new drive path away from the object detected by the collision detection sensor.

* * * * *